United States Patent [19]

Moore et al.

[11] Patent Number: 5,604,915
[45] Date of Patent: Feb. 18, 1997

[54] DATA PROCESSING SYSTEM HAVING LOAD DEPENDENT BUS TIMING

[75] Inventors: Charles H. Moore, Woodside; Russell H. Fish, III, Mt. View, both of Calif.

[73] Assignee: Nanotronics Corporation, Eagle Point, Oreg.

[21] Appl. No.: 485,031

[22] Filed: Jun. 7, 1995

Related U.S. Application Data

[62] Division of Ser. No. 389,334, Aug. 3, 1989, Pat. No. 5,440,749.
[51] Int. Cl.$^6$ .................................................. G06F 13/372
[52] U.S. Cl. .................... 395/800; 364/238.4; 364/942.1
[58] Field of Search ...................................... 395/800, 775, 395/375

[56] References Cited

U.S. PATENT DOCUMENTS 3,849,765  11/1974  Hamano ................................. 395/375
4,217,637  8/1980  Faulkner et al. ........................ 395/550
5,339,448  8/1994  Tanaka et al. ........................... 395/775

*Primary Examiner*—David Y. Eng
*Attorney, Agent, or Firm*—Cooley Godward LLP

[57] ABSTRACT

A data processing system in which timing of data transfer operations are adjusted in response to bus load variation is disclosed herein. The data processing system includes a microprocessor having a sensing circuit, and a driver circuit disposed to impress a signal upon a control line. The control line is also connected to the sensing circuit, as well as to one or more devices external to the microprocessor. The sensing circuit is configured to monitor a response time required for the signal impressed upon the control line to reach a predetermined electrical level, wherein the response time is a function of the number of devices coupled to the control line. The microprocessor is disposed to adjust the timing of data transfer between the microprocessor and the one or more devices external to the microprocessor based upon the monitored response time.

21 Claims, 19 Drawing Sheets

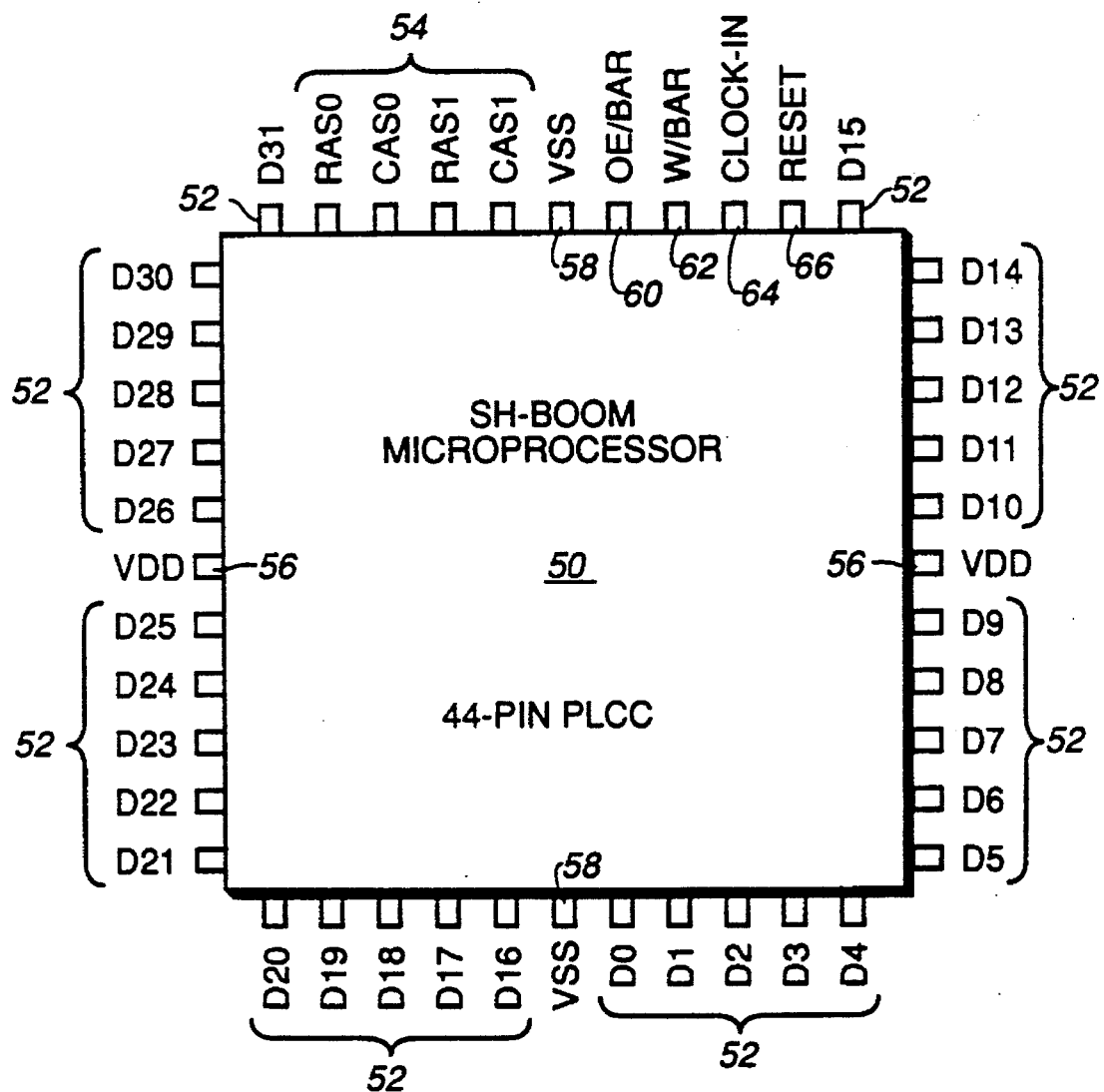
FIG._1

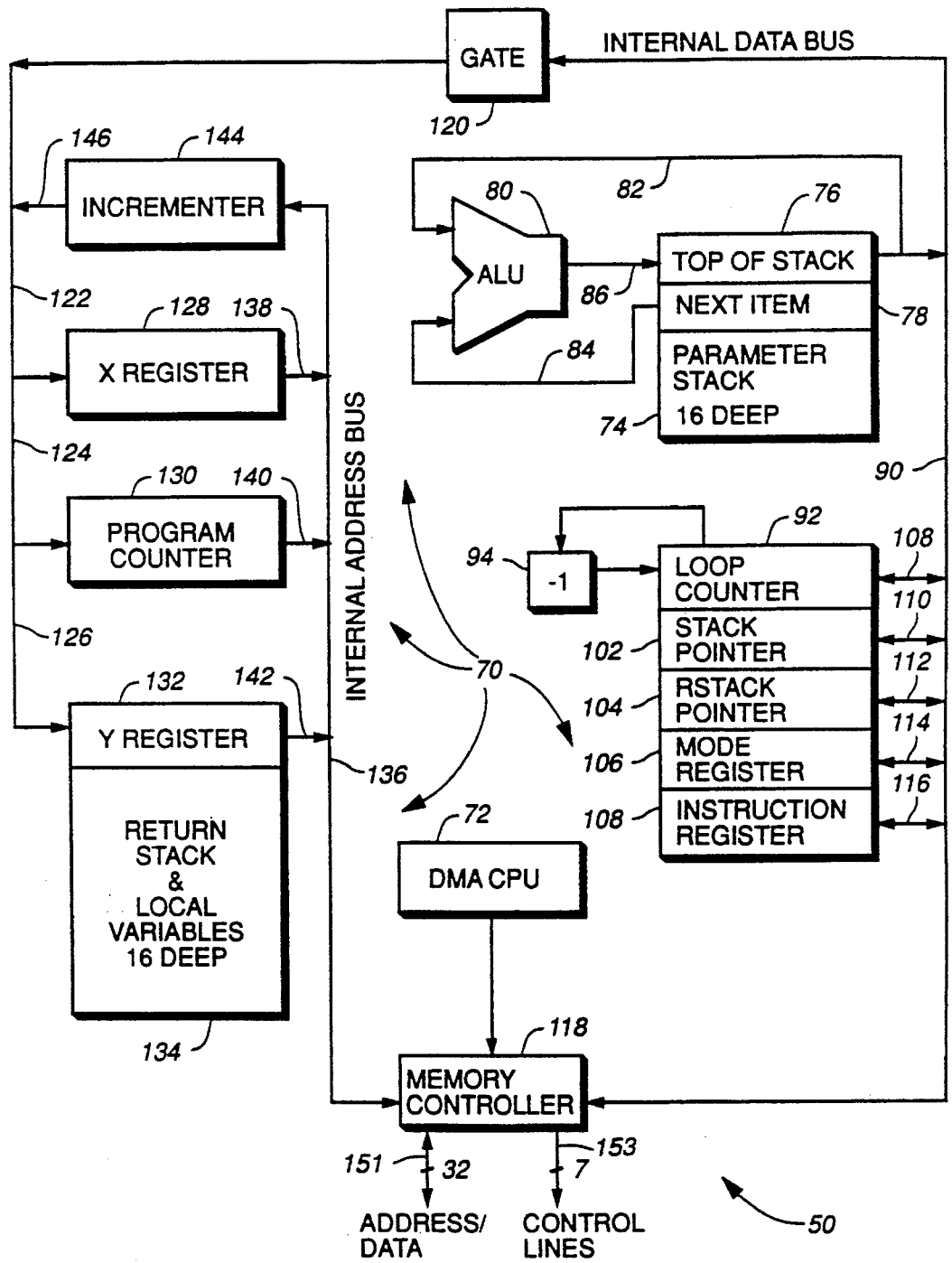
FIG._2

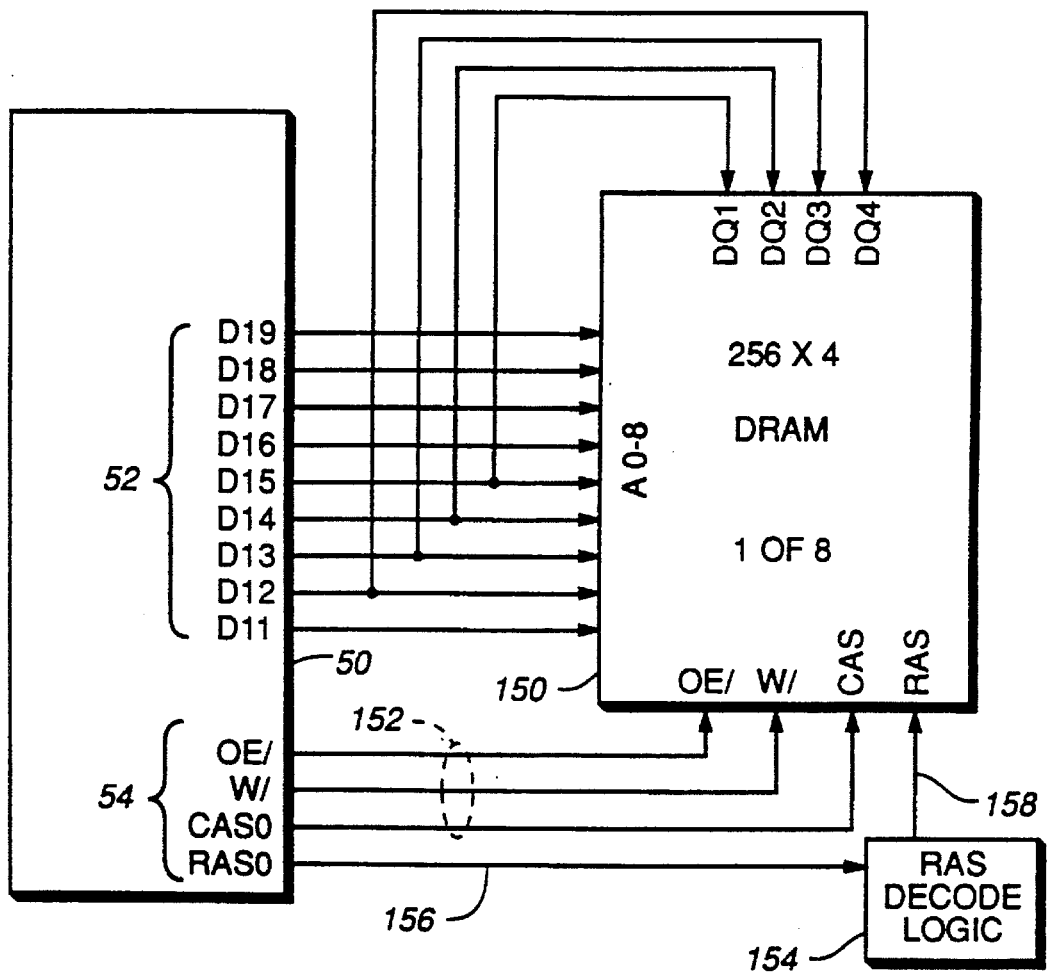
FIG._3

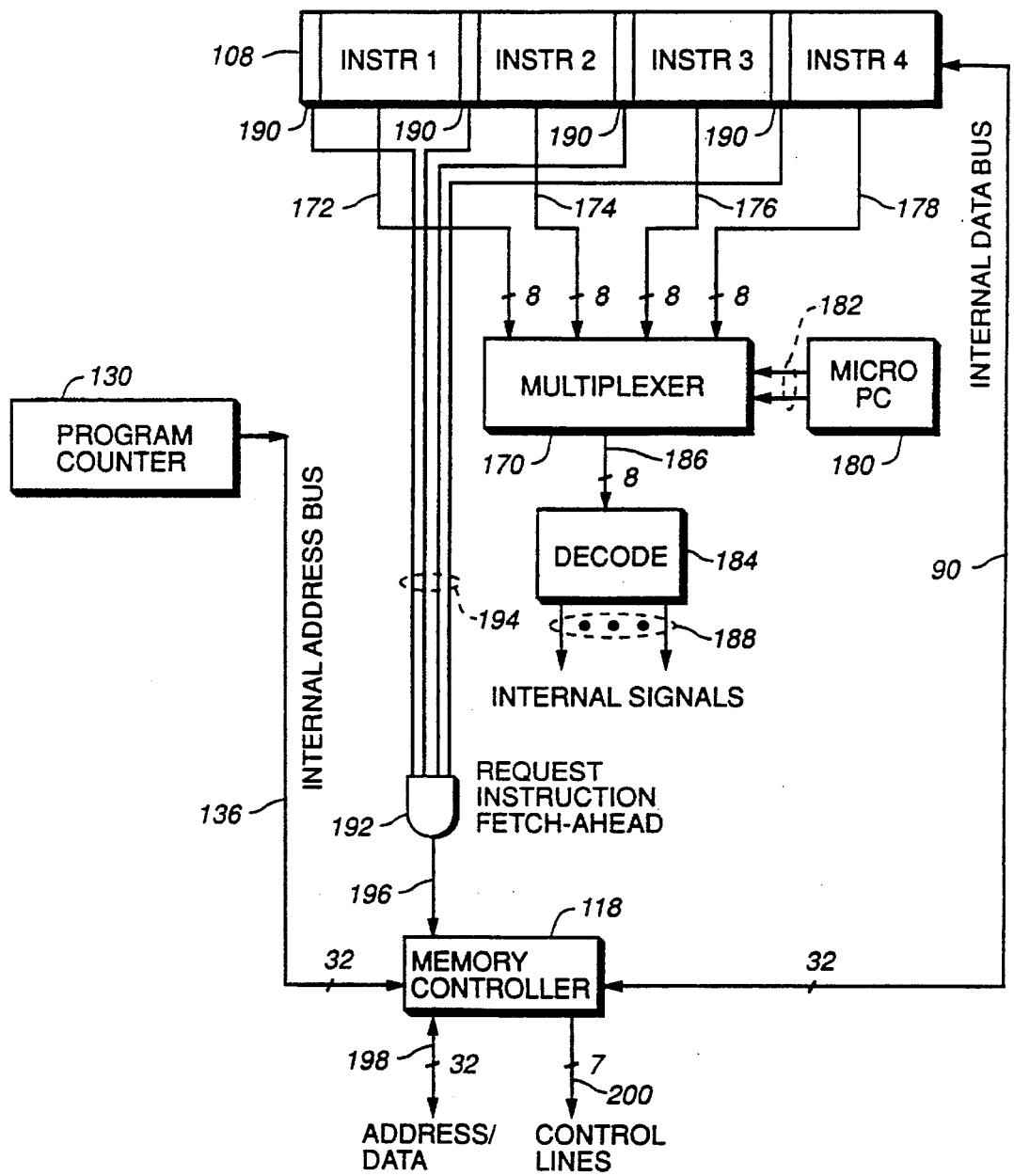
FIG._4

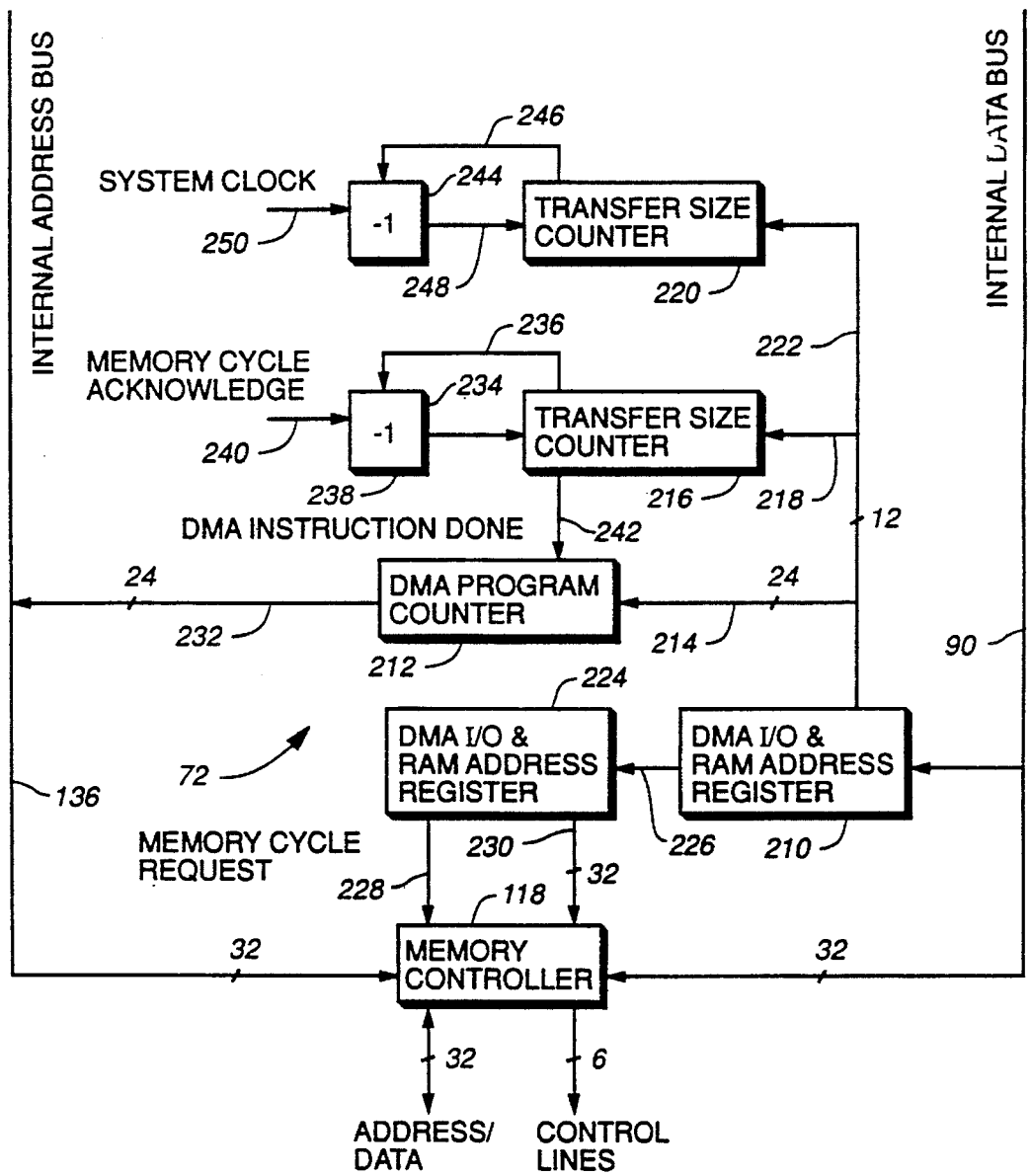
FIG._5

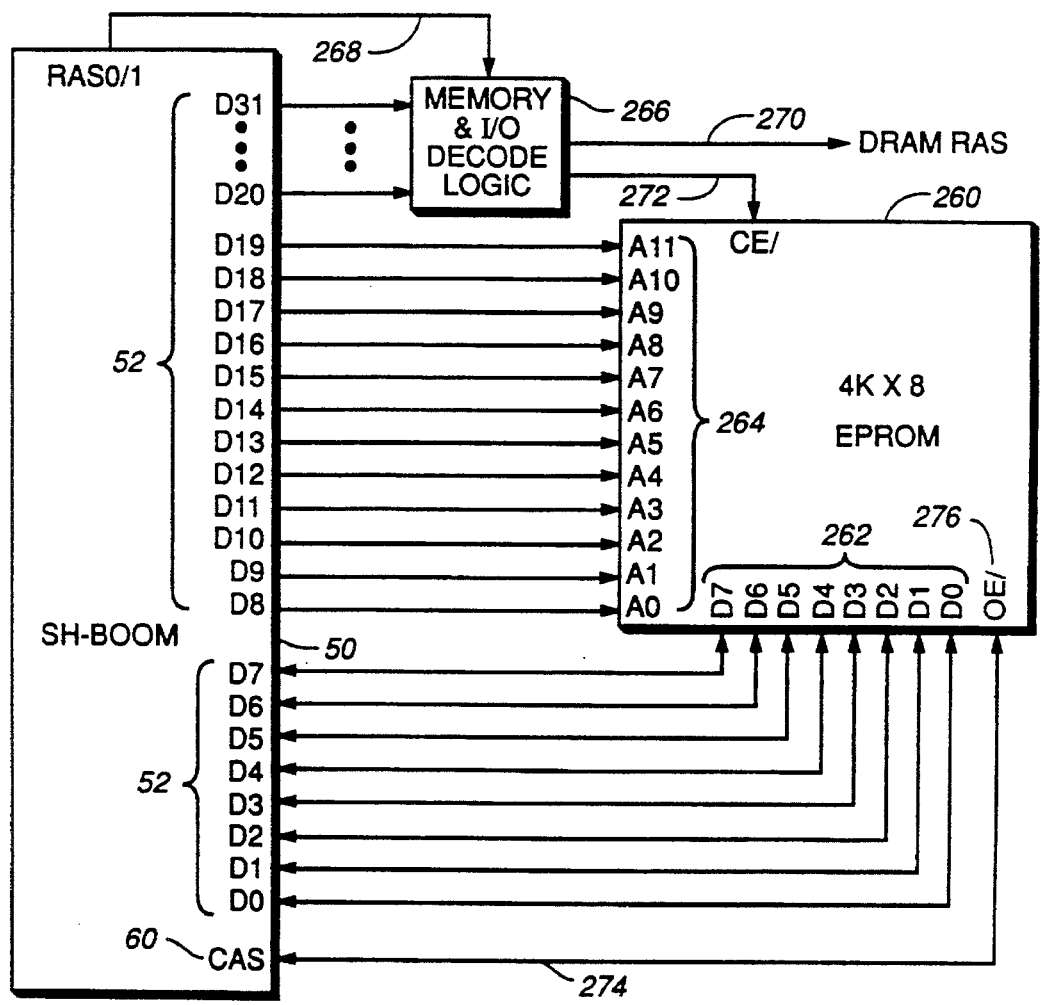
FIG._6

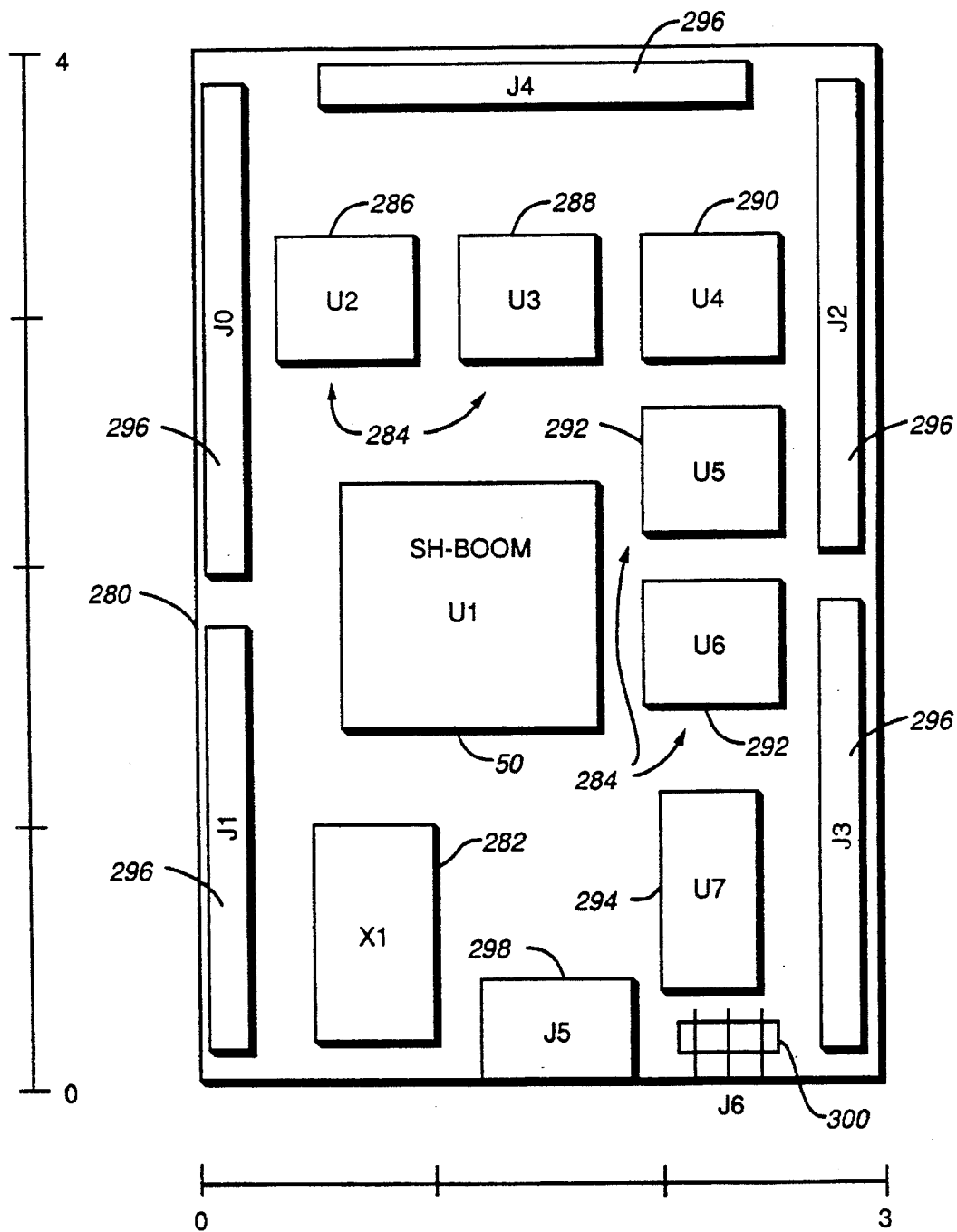
FIG._7

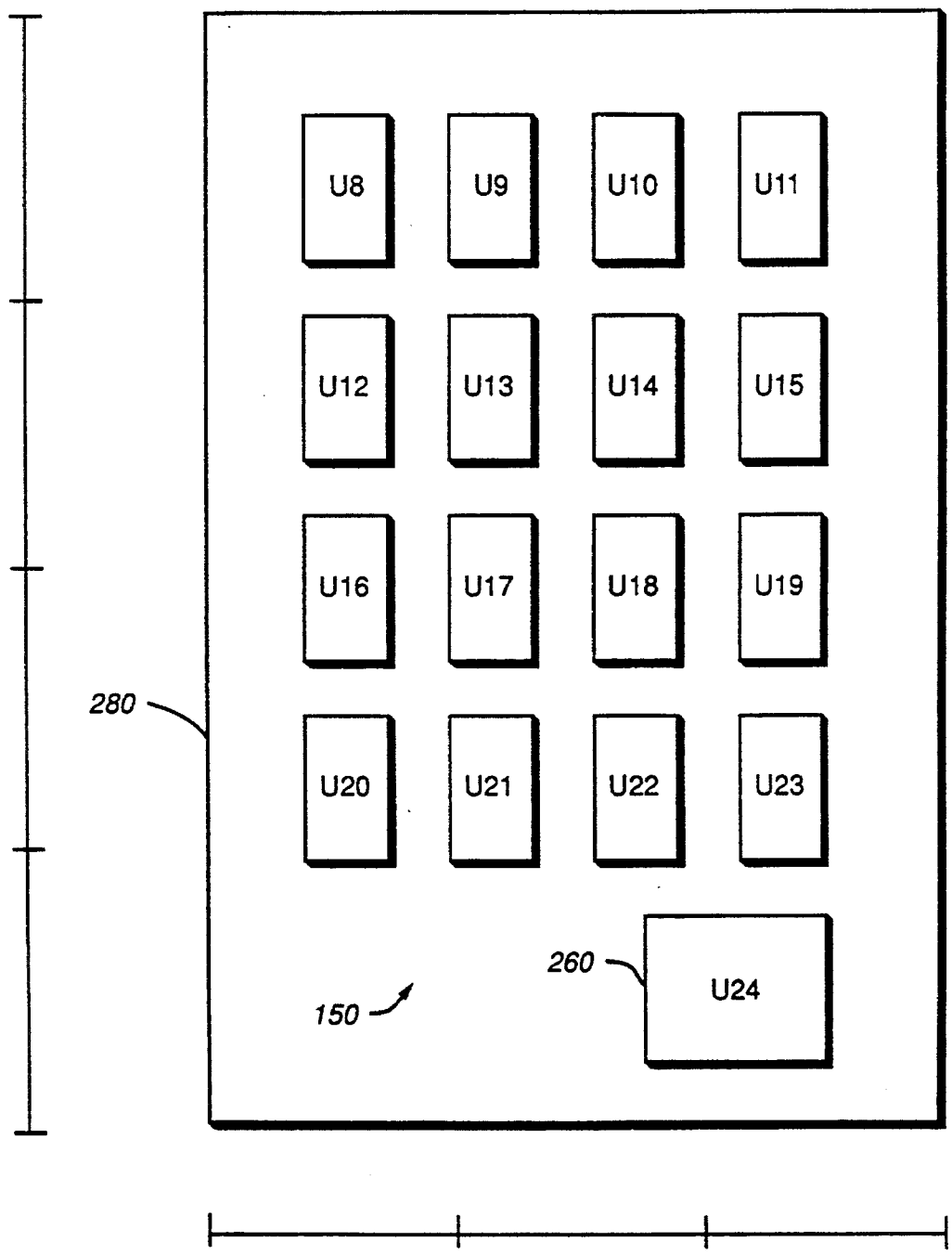
FIG._8

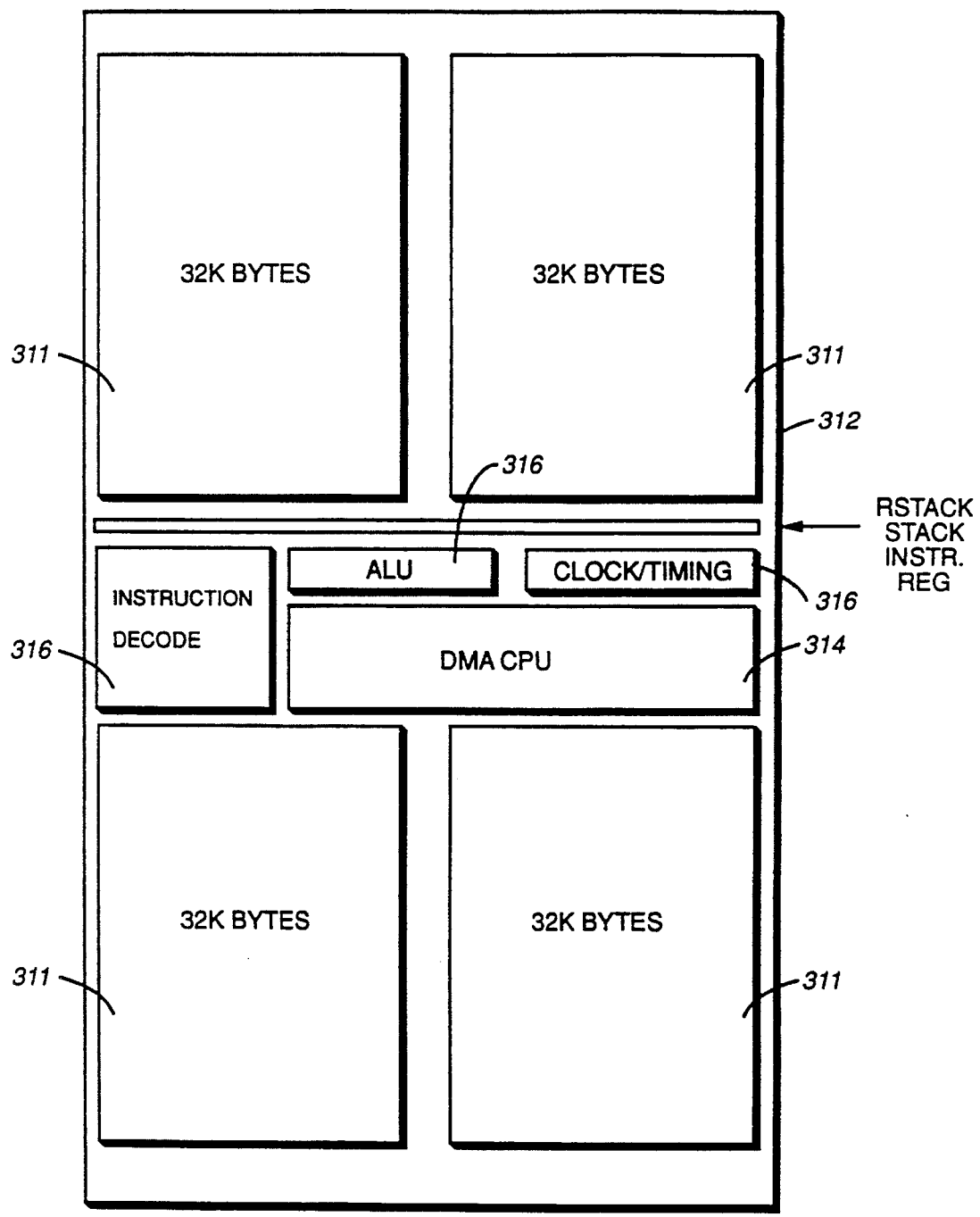
FIG._9

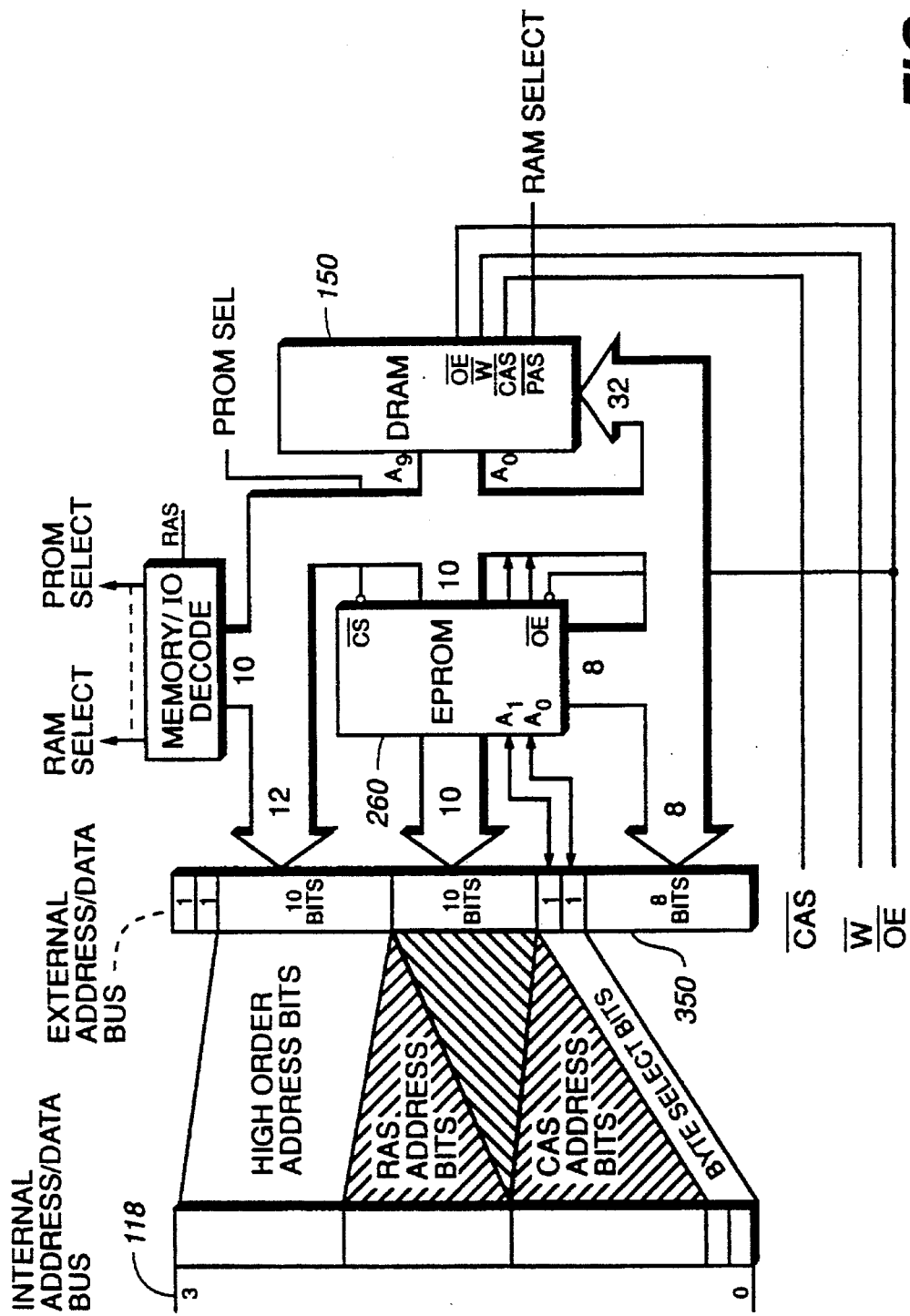
FIG._10

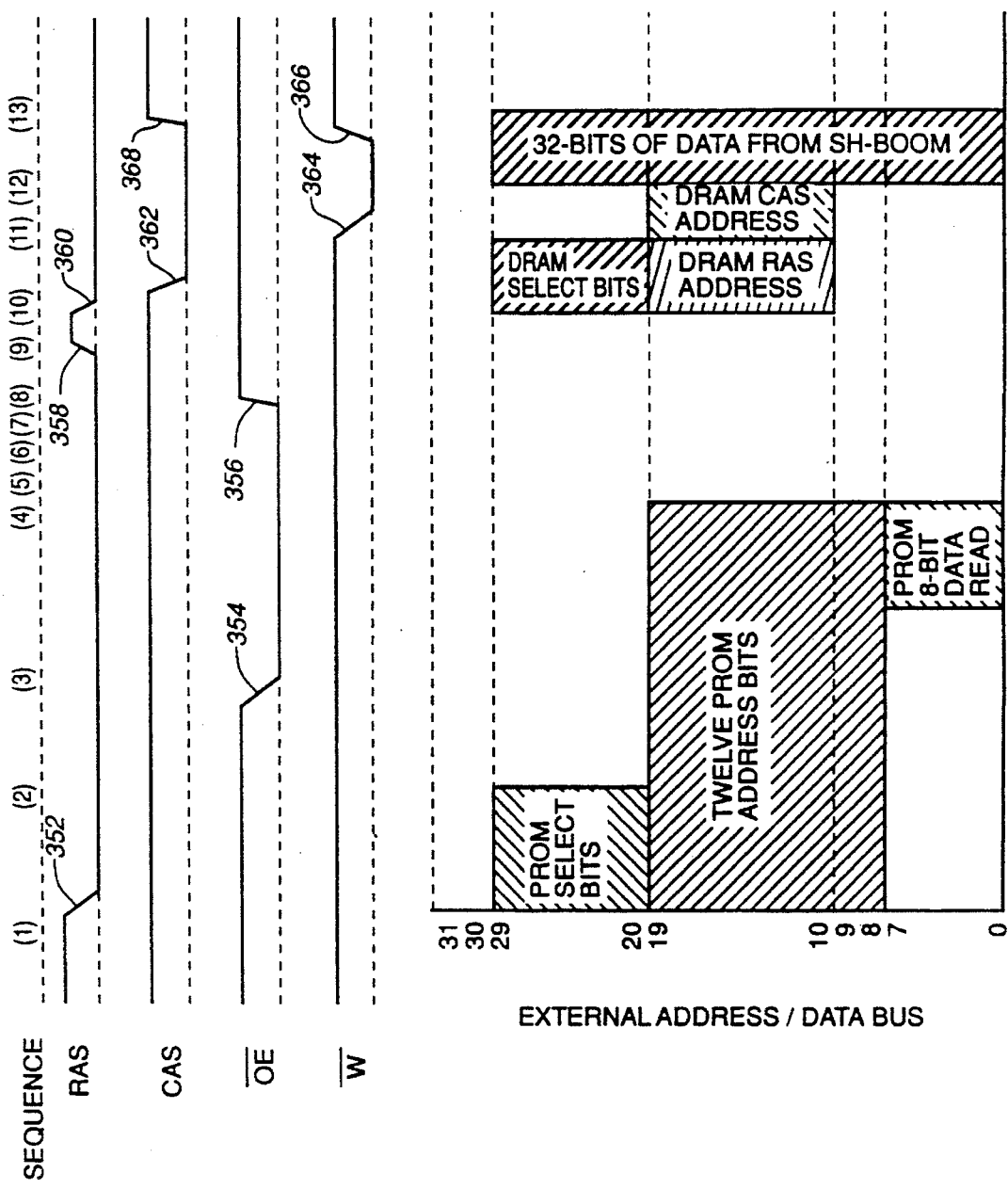
FIG._11

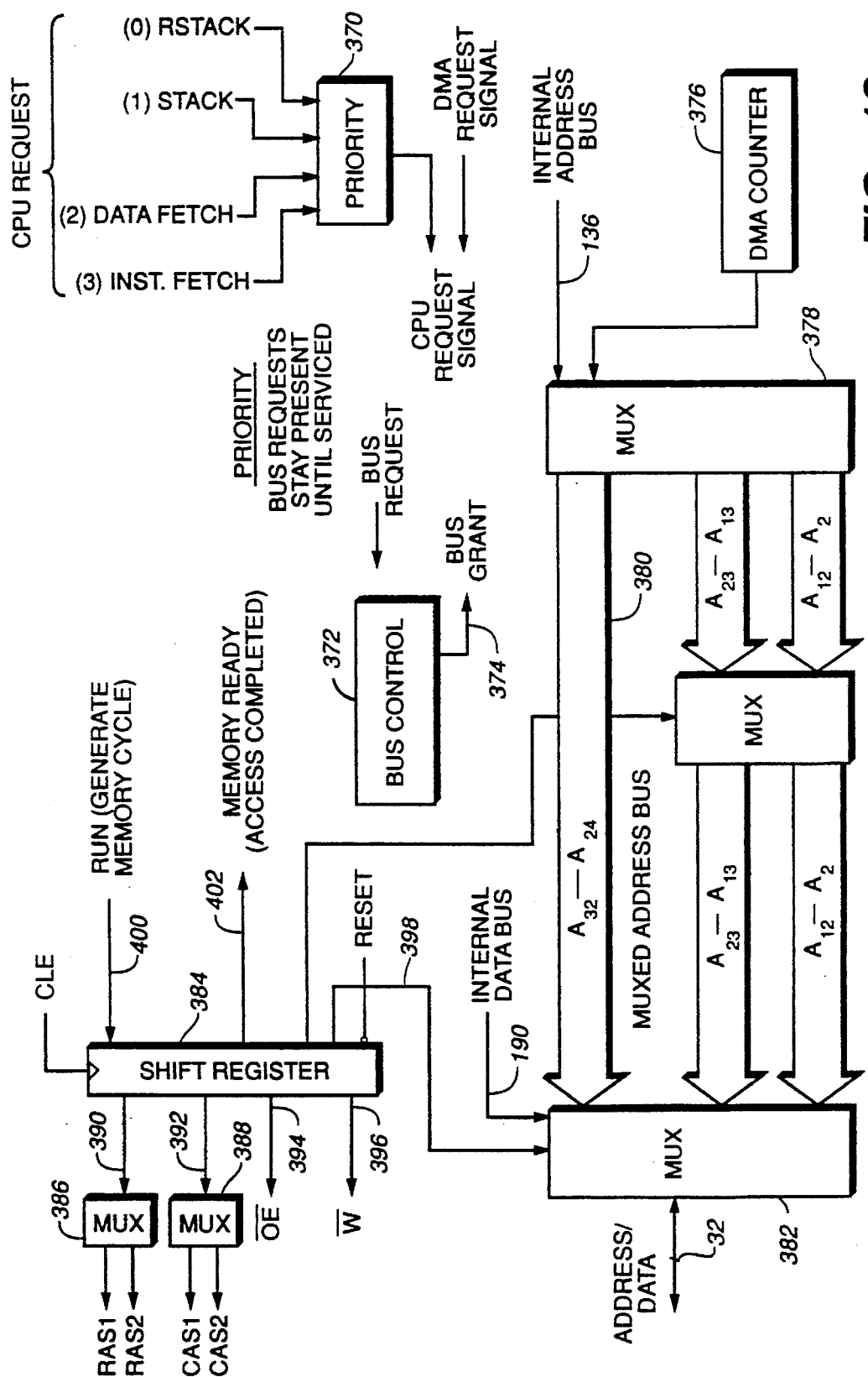
FIG._12

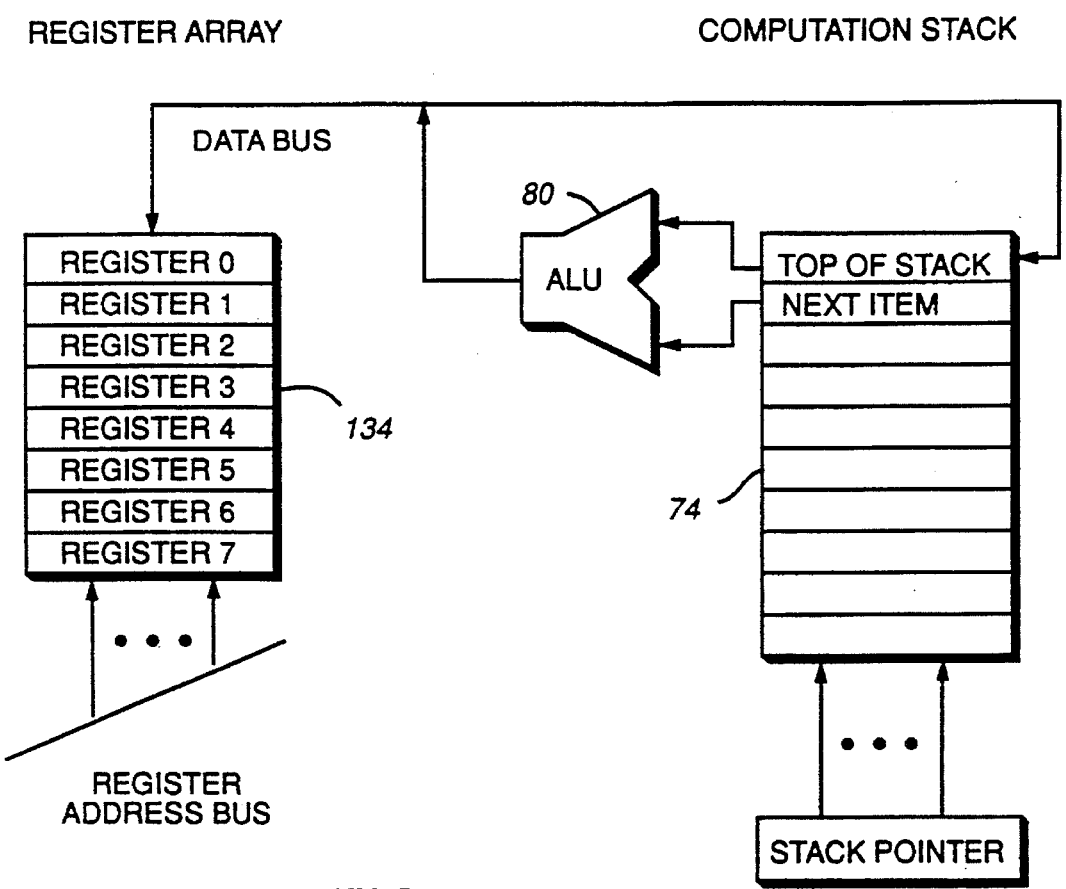
FIG._13

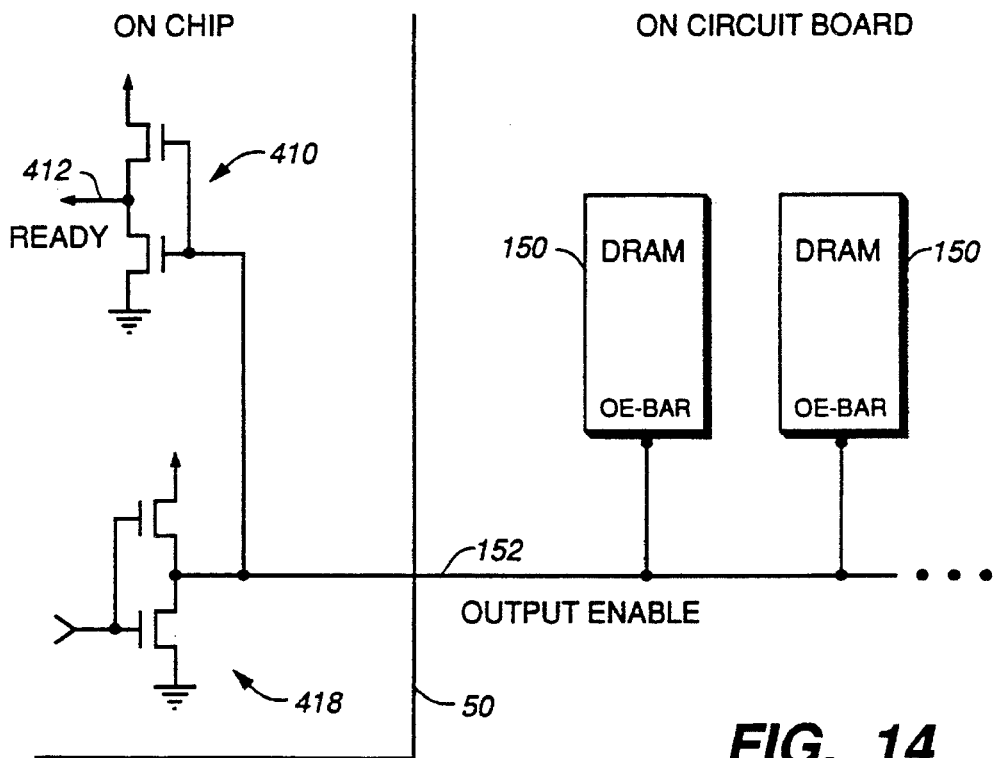
FIG._14
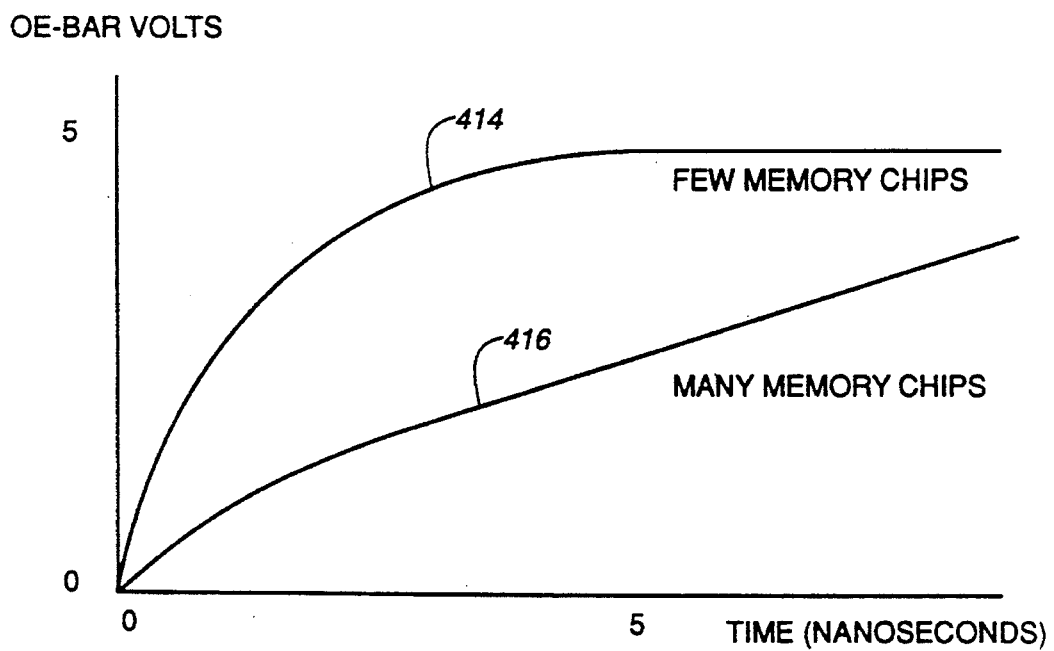
FIG._15

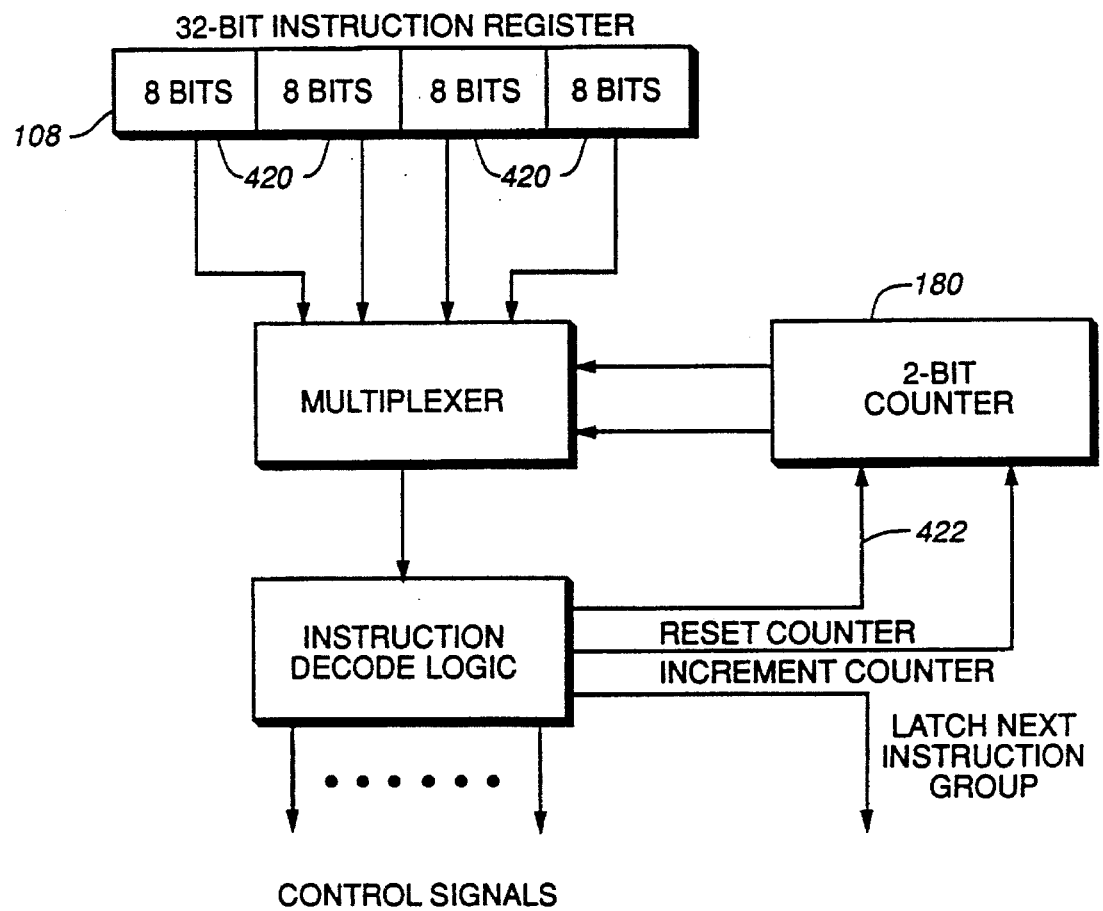
FIG._16
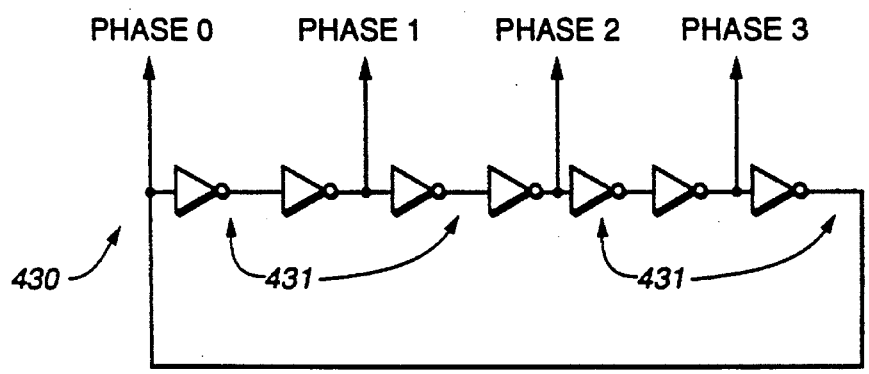
FIG._18

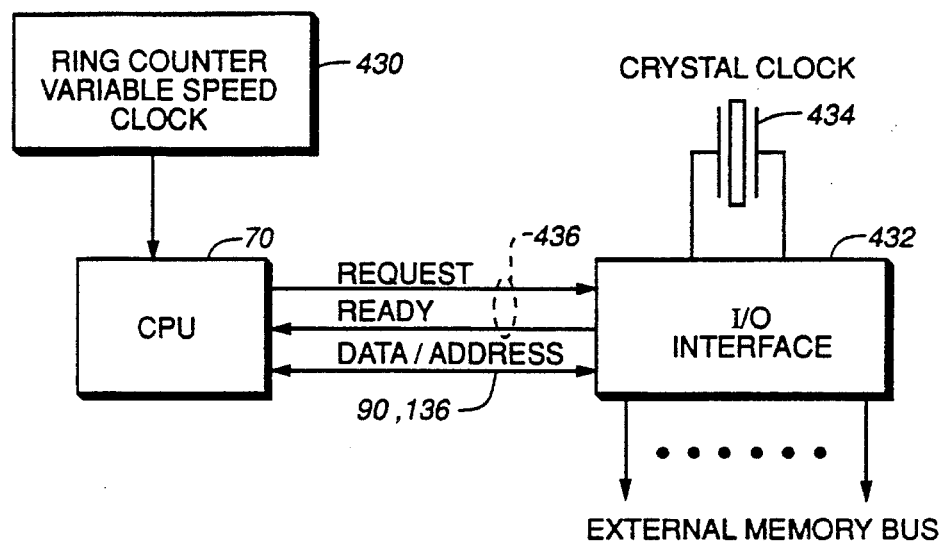
FIG._17
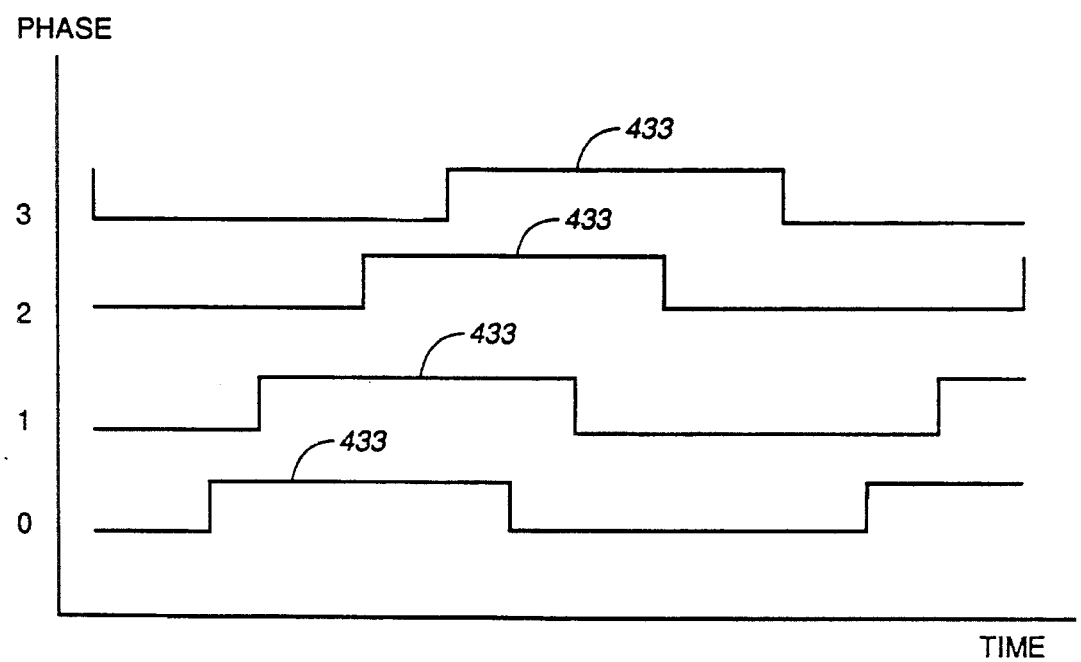
FIG._19

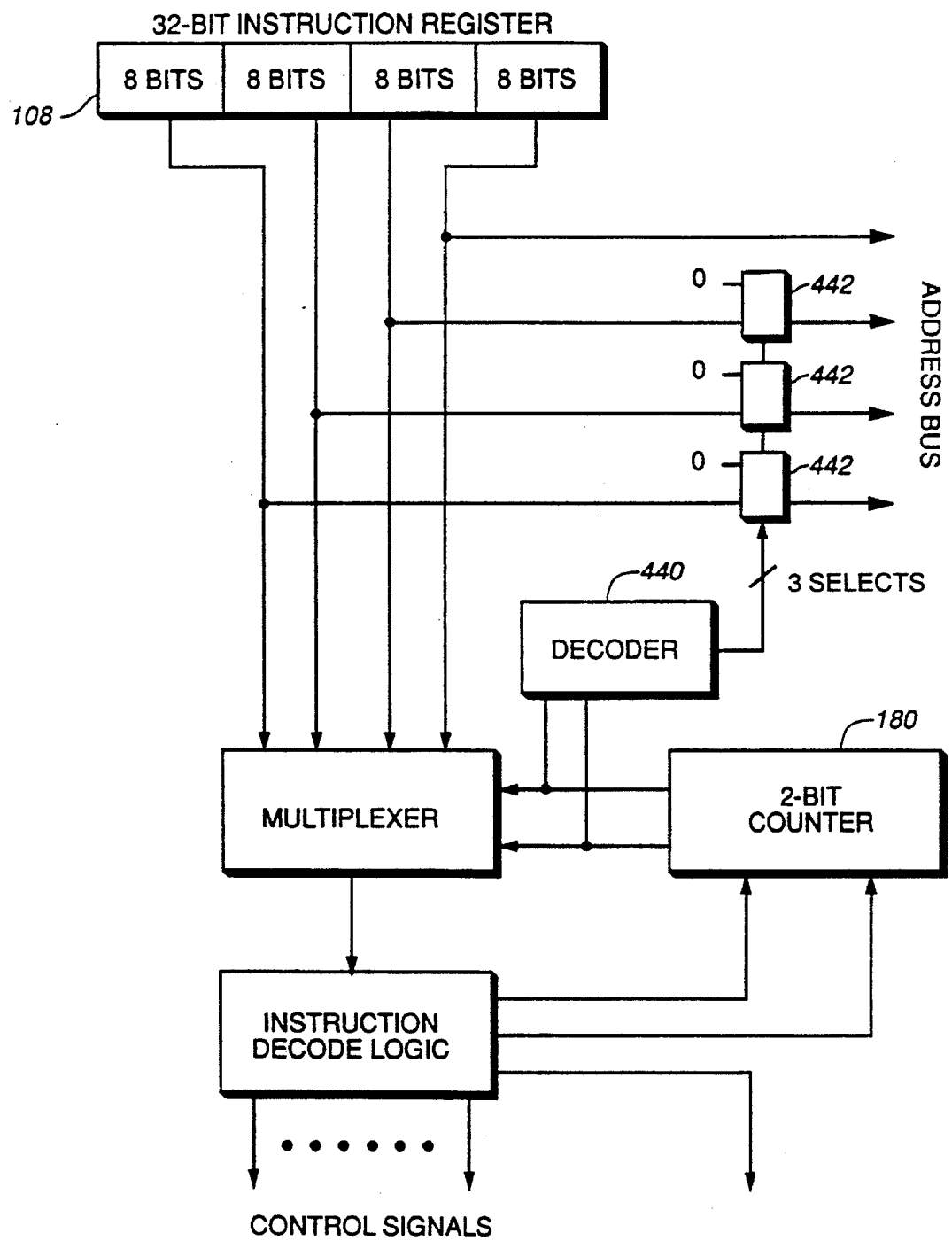
FIG._20

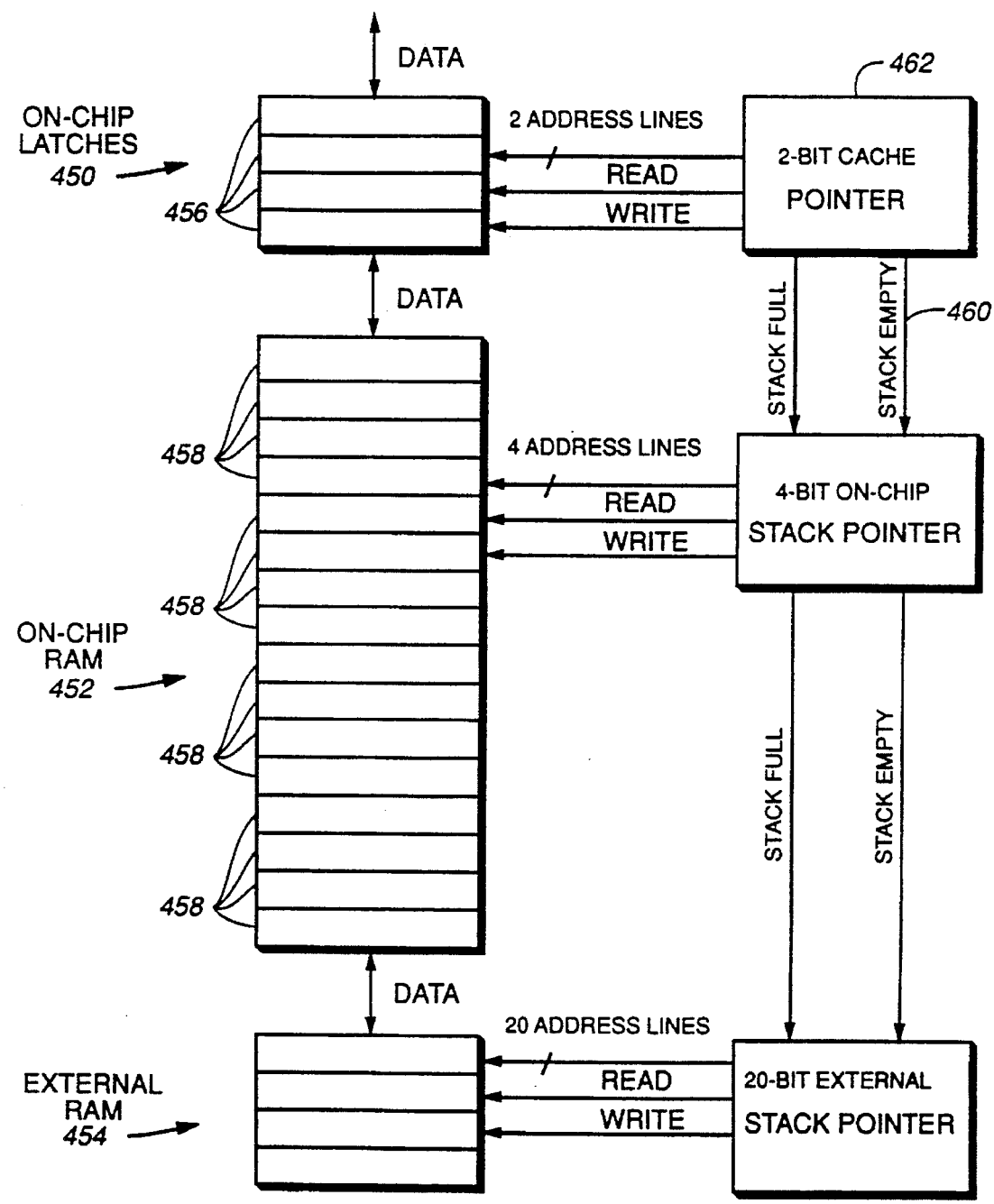
FIG._21

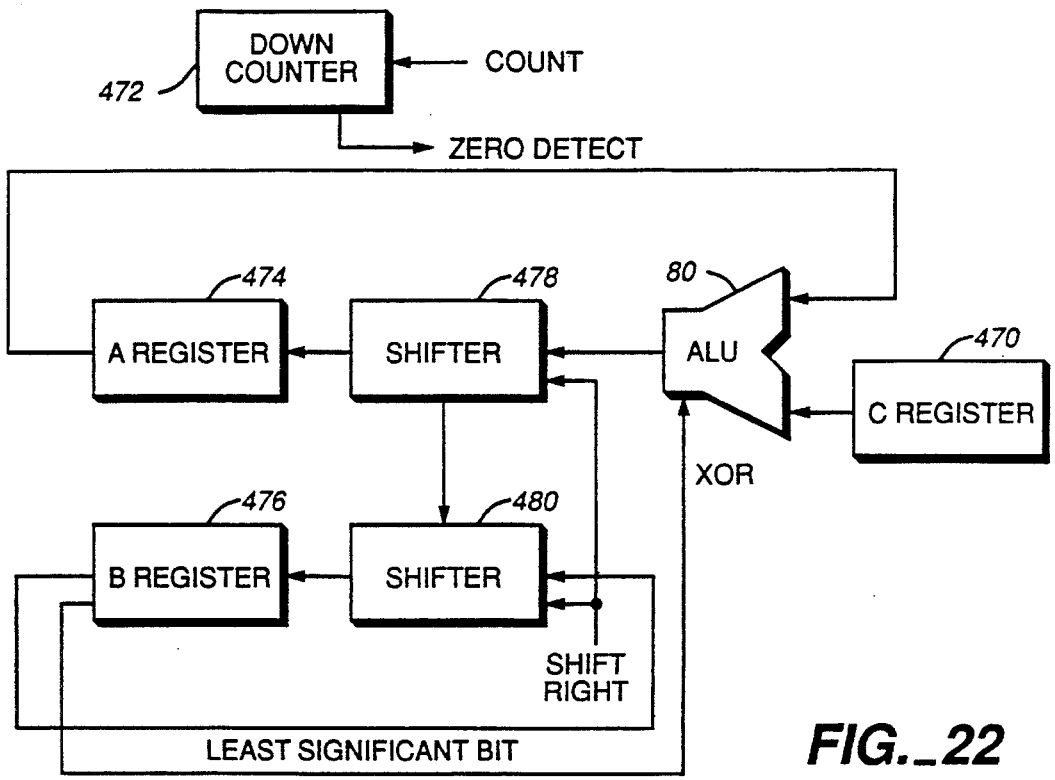
FIG._22
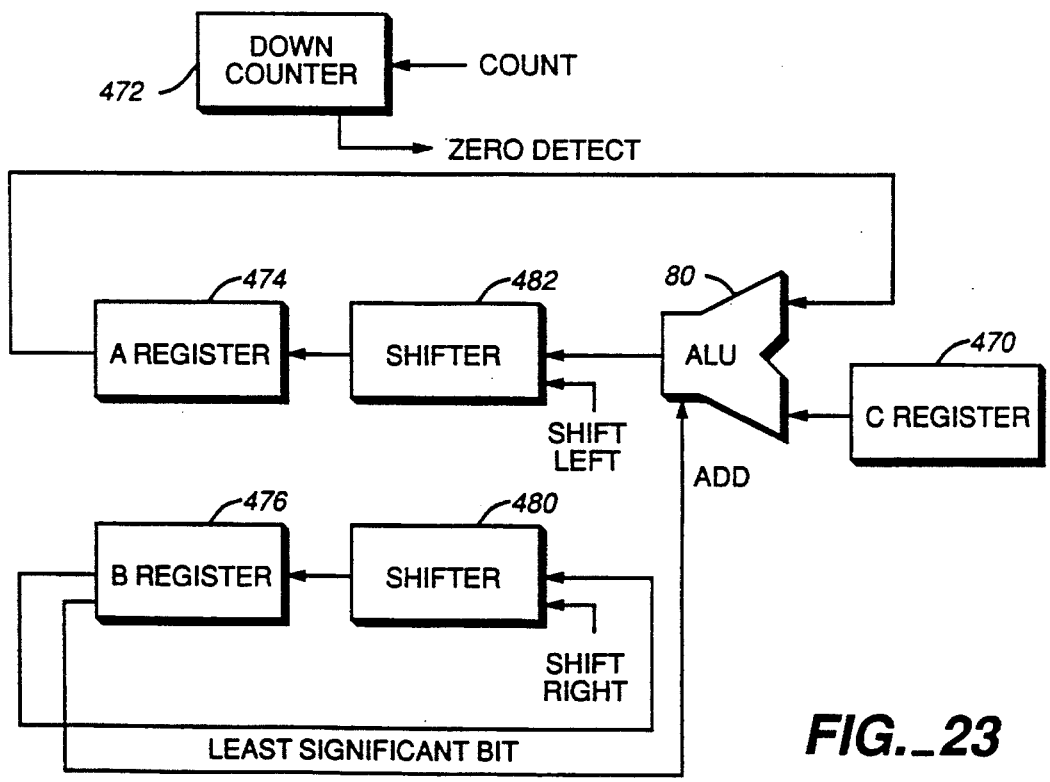
FIG._23

DATA PROCESSING SYSTEM HAVING LOAD DEPENDENT BUS TIMING

CROSS REFERENCE TO RELATED APPLICATIONS

This application is a division of U.S. application Ser. No. 07/389,334, filed Aug. 3, 1989 now U.S. Pat. No. 5,440,749.

BACKGROUND OF THE INVENTION

1. Field of the Invention

The present invention relates generally to a simplified, reduced instruction set computer (RISC) microprocessor. More particularly, it relates to such a microprocessor which is capable of performance levels of, for example, 20 million instructions per second (MIPS) at a price of, for example, 20 dollars.

2. Description of the Prior Art

Since the invention of the microprocessor, improvements in its design have taken two different approaches. In the first approach, a brute force gain in performance has been achieved through the provision of greater numbers of faster transistors in the microprocessor integrated circuit and an instruction set of increased complexity. This approach is exemplified by the Motorola 68000 and Intel 80X86 microprocessor families. The trend, in this approach is to larger die sizes and packages, with hundreds of pinouts.

More recently, it has been perceived that performance gains can be achieved through comparative simplicity, both in the microprocessor integrated circuit itself and in its instruction set. This second approach provides RISC microprocessors, and is exemplified by the Sun SPARC and the Intel 8960 microprocessors. However, even with this approach as conventionally practiced, the packages for the microprocessor are large, in order to accommodate the large number of pinouts that continue to be employed. A need therefore remains for further simplification of high performance microprocessors.

With conventional high performance microprocessors, fast static memories are required for direct connection to the microprocessors in order to allow memory accesses that are fast enough to keep up with the microprocessors. Slower dynamic random access memories (DRAMs) are used with such microprocessors only in a hierarchical memory arrangement, with the static memories acting as a buffer between the microprocessors and the DRAMs. The necessity to use static memories increases cost of the resulting systems.

Conventional microprocessors provide direct memory accesses (DMA) for system peripheral units through DMA controllers, which may be located on the microprocessor integrated circuit, or provided separately. Such DMA controllers can provide routine handling of DMA requests and responses, but some processing by the main central processing unit (CPU) of the microprocessor is required.

SUMMARY OF TYPE INVENTION

Accordingly, it is an object of this invention to provide a microprocessor with a reduced pin count and cost compared to conventional microprocessors.

It is another object of the invention to provide a high performance microprocessor that can be directly connected to DRAMs without sacrificing microprocessor speed.

It is a further object of the invention to provide a high performance microprocessor in which DMA does not require use of the main CPU during DMA requests and responses and which provides very rapid DMA response with predictable response times.

The attainment of these and related objects may be achieved through use of the novel high performance, low cost microprocessor herein disclosed. In accordance with one aspect of the invention, a microprocessor system in accordance with this invention has a central processing unit, a dynamic random access memory and a bus connecting the central processing unit to the dynamic random access memory. There is a multiplexing means on the bus between the central processing unit and the dynamic random access memory. The multiplexing means is connected and configured to provide row addresses, column addresses and data on the bus.

In accordance with another aspect of the invention, the microprocessor system has a means connected to the bus for fetching instructions for the central processing unit on the bus. The means for fetching instructions is configured to fetch multiple sequential instructions in a single memory cycle. In a variation of this aspect of the invention, a programmable read only memory containing instructions for the central processing unit is connected to the bus. The means for fetching instructions includes means for assembling a plurality of instructions from the programmable read only memory and storing the plurality of instructions in the dynamic random access memory.

In another aspect of the invention, the microprocessor system includes a central processing unit, a direct memory access processing unit and a memory connected by a bus. The direct memory access processing unit includes means for fetching instructions for the central processing unit and for fetching instructions for the direct memory access processing unit on the bus.

In a further aspect of the invention, the microprocessor system, including the memory, is contained in an integrated circuit. The memory is a dynamic random access memory, and the means for fetching multiple instructions includes a column latch for receiving the multiple instructions.

In still another aspect of the invention, the microprocessor system additionally includes an instruction register for the multiple instructions connected to the means for fetching instructions. A means is connected to the instruction register for supplying the multiple instructions in succession from the instruction register. A counter is connected to control the means for supplying the multiple instructions to supply the multiple instructions in succession. A means for decoding the multiple instructions is connected to receive the multiple instructions in succession from the means for supplying the multiple instructions. The counter is connected to said means for decoding to receive incrementing and reset control signals from the means for decoding. The means for decoding is configured to supply the reset control signal to the counter and to supply a control signal to the means for fetching instructions in response to a SKIP instruction in the multiple instructions. In a modification of this aspect of the invention, the microprocessor system additionally has a loop counter connected to receive a decrement control signal from the means for decoding. The means for decoding is configured to supply the reset control signal to the counter and the decrement control signal to the loop counter in response to a MICROLOOP instruction in the multiple instructions. In a further modification to this aspect of the invention, the means for decoding is configured to control the counter in response to instruction utilizing a variable width operand. A means is connected to the counter to select the variable width operand in response to the counter.

In a still further aspect of the invention, the microprocessor system includes an arithmetic logic unit. A first push down stack is connected to the arithmetic logic unit. The first push down stack includes means for storing a top item connected to a first input of the arithmetic logic unit and means for storing a next item connected to a second input of the arithmetic logic unit. The arithmetic logic unit has an output connected to the means for storing a top item. The means for storing a top item is connected to provide an input to a register file. The register file desirably is a second push down stack, and the means for storing a top item and the register file are bidirectionally connected.

In another aspect of the invention, a data processing system has a microprocessor including a sensing circuit and a driver circuit, a memory, and an output enable line connected between the memory, the sensing circuit and the driver circuit. The sensing circuit is configured to provide a ready signal when the output enable line reaches a predetermined electrical level, such as a voltage. The microprocessor is configured so that the driver circuit provides an enabling signal on the output enable line responsive to the ready signal.

In a further aspect of the invention, the microprocessor system has a ring counter variable speed system clock connected to the central processing unit. The central processing unit and the ring counter variable speed system clock are provided in a single integrated circuit. An input/output interface is connected to exchange coupling control signals, addresses and data with the input/output interface. A second clock independent of the ring counter variable speed system clock is connected to the input/output interface.

In yet another aspect of the invention, a push down stack is connected to the arithmetic logic unit. The push down stack includes means for storing a top item connected to a first input of the arithmetic logic unit and means for storing a next item connected to a second input of the arithmetic logic unit. The arithmetic logic unit has an output connected to the means for storing a top item. The push down stack has a first plurality of stack elements configured as latches and a second plurality of stack elements configured as a random access memory. The first and second plurality of stack elements and the central processing unit are provided in a single integrated circuit. A third plurality of stack elements is configured as a random access memory external to the single integrated circuit. In this aspect of the invention, desirably a first pointer is connected to the first plurality of stack elements, a second pointer connected to the second plurality of stack elements, and a third pointer is connected to the third plurality of stack elements. The central processing unit is connected to pop items from the first plurality of stack elements. The first stack pointer is connected to the second stack pointer to pop a first plurality of items from the second plurality of stack elements when the first plurality of stack elements are empty from successive pop operations by the central processing unit. The second stack pointer is connected to the third stack pointer to pop a second plurality of items from the third plurality of stack elements when the second plurality of stack elements are empty from successive pop operations by the central processing unit.

In another aspect of the invention, a first register is connected to supply a first input to the arithmetic logic unit. A first shifter is connected between an output of the arithmetic logic unit and the first register. A second register is connected to receive a starting polynomial value. An output of the second register is connected to a second shifter. A least significant bit of the second register is connected to The arithmetic logic unit. A third register is connected to supply feedback terms of a polynomial to the arithmetic logic unit. A down counter, for counting down a number corresponding to digits of a polynomial to be generated, is connected to the arithmetic logic unit. The arithmetic logic unit is responsive to a polynomial instruction to carry out an exclusive OR of the contents of the first register with the contents of the third register if the least significant bit of the second register is a "ONE" and to pass the contents of the first register unaltered if the least significant bit of the second register is a "ZERO", until the down counter completes a count. The polynomial to be generated results in said first register.

In still another aspect of the invention, a result register is connected to supply a first input to the arithmetic logic unit. A first, left shifting shifter is connected between an output of the arithmetic logic unit and the result register. A multiplier register is connected to receive a multiplier in bit reversed form. An output of the multiplier register is connected to a second, right shifting shifter. A least significant bit of the multiplier register is connected to the arithmetic logic unit. A third register is connected to supply a multiplicand to said arithmetic logic unit. A down counter, for counting down a number corresponding to one less than the number of digits of the multiplier, is connected to the arithmetic logic unit. The arithmetic logic unit is responsive to a multiply instruction to add the contents of the result register with the contents of the third register, when the least significant bit of the multiplier register is a "ONE" and to pass the contents of the result register unaltered, until the down counter completes a count. The product results in the result register.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is an external, plan view of an integrated circuit package incorporating a microprocessor in accordance with the invention.

FIG. 2 is a block diagram of a microprocessor in accordance with the invention.

FIG. 3 is a block diagram of a portion of a data processing system incorporating the microprocessor of FIGS. 1 and 2.

FIG. 4 is a more detailed block diagram of a portion of the microprocessor shown in FIG. 2.

FIG. 5 is a more detailed block diagram of another portion of the microprocessor shown in FIG. 2.

FIG. 6 is a block diagram of another portion of the data processing system shown in part in FIG. 3 and incorporating the microprocessor of FIGS. 1–2 and 4–5.

FIGS. 7 and 8 are layout diagrams for the data processing system shown in part in FIGS. 3 and 6.

FIG. 9 is a layout diagram of a second embodiment of a microprocessor in accordance with the invention in a data processing system on a single integrated circuit.

FIG. 10 is a more detailed block diagram of a portion of the data processing system of FIGS. 7 and 8.

FIG. 11 is a timing diagram useful for understanding operation of the system portion shown in FIG. 12.

FIG. 12 is another more detailed block diagram of a further portion of the data processing system of FIGS. 7 and 8.

FIG. 13 is a more detailed block diagram of a portion of the microprocessor shown in FIG. 2.

FIG. 14 is a more detailed block and schematic diagram of a portion of the system shown in FIGS. 3 and 7–8.

FIG. 15 is a graph useful for understanding operation of the system portion shown in FIG. 14.

FIG. 16 is a more detailed block diagram showing part of the system portion shown in FIG. 4.

FIG. 17 is a more detailed block diagram of a portion of the microprocessor shown in FIG. 2.

FIG. 18 is a more detailed block diagram of part of the microprocessor portion shown in FIG. 17.

FIG. 19 is a set of waveform diagrams useful for understanding operation of the part of the microprocessor portion shown in FIG. 18.

FIG. 20 is a more detailed block diagram showing another part of the system portion shown in FIG. 4.

FIG. 21 is a more detailed block diagram showing another part of the system portion shown in FIG. 4.

FIGS. 22 and 23 are more detailed block diagrams showing another part of the system portion shown in FIG. 4.

DETAILED DESCRIPTION OF THE INVENTION

OVERVIEW

The microprocessor of this invention is desirably implemented as a 32-bit microprocessor optimized for:

HIGH EXECUTION SPEED, and

LOW SYSTEM COST.

In this embodiment, the microprocessor can be thought of as 20 MIPS for 20 dollars. Important distinguishing features of the microprocessor are:

Uses low-cost commodity DYNAMIC RAMS to run 20 MIPS 4 instruction fetch per memory cycle On-chip fast page-mode memory management Runs fast without external cache Requires few interfacing chips Crams 32-bit CPU in 44 pin SOJ package The instruction set is organized so that most operations can be specified with 8-bit instructions. Two positive products of this philosophy are:

Programs are smaller,

Programs can execute much faster.

The bottleneck in most computer systems is the memory bus. The bus is used to fetch instructions and fetch and store data. The ability to fetch four instructions in a single memory bus cycle significantly increases the bus availability to handle data.

Turning now to the drawings, more particularly to FIG. 1, there is shown a packaged 32-bit microprocessor 50 in a 44-pin plastic leadless chip carrier, shown approximately 100 times its actual size of about 0.8 inch on a side. The fact that the microprocessor 50 is provided as a 44-pin package represents a substantial departure from typical microprocessor packages, which usually have about 200 input/output (I/O) pins. The microprocessor 50 is rated at 20 million instructions per second (MIPS). Address and data lines 52, also labelled D0–D31, are shared for addresses and data without speed penalty as a result of the manner in which the microprocessor 50 operates, as will be explained below.

DYNAMIC RAM

In addition to the low cost 44-pin package, another unusual aspect of the high performance microprocessor 50 is that it operates directly with dynamic random access memories (DRAMs), as shown by row address strobe (RAS) and column address strobe (CAS) I/O pins 54. The other I/O pins for the microprocessor 50 include $V_{DD}$ pins 56, $V_{SS}$ pins 58, output enable pin 60, write pin 62, clock pin 64 and reset pin 66.

All high speed computers retire high speed and expensive memory to keep up. The highest speed static RAM memories cost as much as ten times as much as slower dynamic RAMs. This microprocessor has been optimized to use low-cost dynamic RAM in high-speed page-mode. Page-mode dynamic RAMs offer static RAM performance without the cost penalty. For example, low-cost 85 nsec. dynamic RAMs access at 25 nsec when operated in fast page-mode. Integrated fast page-mode control on the microprocessor chip simplifies system interfacing and results in a faster system.

Details of the microprocessor 50 are shown in FIG. 2. The microprocessor 50 includes a main central processing unit (CPU) 70 and a separate direct memory access (DMA) CPU 72 in a single integrated circuit making up the microprocessor 50. The main CPU 70 has a first 16 deep push down stack 74, which has a top item register 76 and a next item register 78, respectively connected to provide inputs to an arithmetic logic unit (ALU) 80 by lines 82 and 84. An output of the ALU 80 is connected to the top item register 76 by line 86. The output of the top item register at 82 is also connected by line 88 to an internal data bus 90.

A loop counter 92 is connected to a decrementer 94 by lines 96 and 98. The loop counter 92 is bidirectionally connected to the internal data bus 90 by line 100. Stack pointer 102, return stack pointer 104, mode register 106 and instruction register 108 are also connected to the internal data bus 90 by lines 110, 112, 114 and 116, respectively. The internal data bus 90 is connected to memory controller 118 and to gate 120. The gate 120 provides inputs on lines 122, 124, and 126 to X register 128, program counter 130 and Y register 132 of return push down stack 134. The X register 128, program counter 130 and Y register 132 provide outputs to internal address bus 136 on lines 138, 140 and 142. The internal address bus provides inputs to the memory controller 118 and to an incrementer 144. The incrementer 144 provides inputs to the X register, program counter and Y register via lines 146, 122, 124 and 126. The DMA CPU 72 provides inputs to the memory controller 118 on line 148. The memory controller 118 is connected to a RAM (not shown) by address/data bus 151 and control lines 153.

FIG. 2 shows that the microprocessor 50 has a simple architecture. Prior art RISC microprocessors are substantially more complex in design. For example, the SPARC RISC microprocessor has three times the gates of the microprocessor 50, and the Intel 8960 RISC microprocessor has 20 times the gates of the microprocessor 50. The speed of this microprocessor is in substantial part due to this simplicity. The architecture incorporates push down stacks and register write to achieve this simplicity.

The microprocessor 50 incorporates an I/O that has been tuned to make heavy use of resources provided on the integrated circuit chip. On chip latches allow use of the same I/O circuits to handle three different things: column addressing, row addressing and data, with a slight to non-existent speed penalty. This triple bus multiplexing results in fewer buffers to expand, fewer interconnection lines, fewer I/O pins and fewer internal buffers.

The provision of on-chip DRAM control gives a performance equal to that obtained with the use of static RAMs. As a result, memory is provided at ¼ the system cost of static RAM used in most RISC systems.

The microprocessor 50 fetches 4 instructions per memory cycle; the instructions are in an 8-bit format, and this is a 32-bit microprocessor. System speed is therefore 4 times the memory bus bandwidth. This ability enables the microprocessor to break the Von Neumann bottleneck of the speed of getting the next instruction. This mode of operation is possible because of the use of a push down stack and register array. The push down stack allows the use of implied addresses, rather than the prior art technique of explicit addresses for two sources and a destination.

Most instructions execute in 20 nanoseconds in the microprocessor 50. The microprocessor can therefore execute instructions at 50 peak MIPS without pipeline delays. This is a function of the small number of gates in the microprocessor 50 and the high degree of parallelism in the architecture of the microprocessor.

FIG. 3 shows how column and row addresses are multiplexed on lines D5-D14 of the microprocessor 50 for addressing DRAM 150 from I/O pins 52. The DRAM 150 is one of eight, but only one DRAM 150 has been shown for clarity. As shown, the lines D11-D18 are respectively connected to row address inputs A0-A8 of the DRAM 150. Additionally, lines D12-D15 are connected to the data inputs DQ1-DQ4 of the DRAM 150. The output enable, write and column address strobe pins 54 are respectively connected to the output enable, write and column address strobe inputs of the DRAM 150 by lines 152. The row address strobe pin 54 is connected through row address strobe decode logic 154 to the row address strobe input of the DRAM 150 by lines 156 and 158.

D0–D7 pins 52 (FIG. 1) are idle when the microprocessor 50 is outputting multiplexed row and column addresses on D11–D18 pins 52. The D0–D7 pins 52 can therefore simultaneously be used for I/O when right justified I/O is desired. Simultaneous addressing and I/O can therefore be carried out.

FIG. 4 shows how the microprocessor 50 is able to achieve performance equal to the use of static RAMS with DRAMs through multiple instruction fetch in a single clock cycle and instruction fetch-ahead. Instruction register 108 receives four 8-bit byte instruction words 1–4 on 32-bit internal data bus 90. The four instruction byte 1–4 locations of the instruction register 108 are connected to. multiplexer 170 by busses 172, 174, 176 and 178, respectively. A microprogram counter 180 is connected to the multiplexer 170 by lines 182. The multiplexer 170 is connected to decoder 184 by bus 186. The decoder 184 provides internal signals to the rest of the microprocessor 50 on lines 188.

Most significant bits 190 of each instruction byte 1–4 location are connected to a 4-input decoder 192 by lines 194. The output of decoder 192 is connected to memory controller 118 by line 196. Program counter 130 is connected to memory controller 118 by internal address bus 136, and the instruction register 108 is connected to the memory controller 118 by the internal data bus 90. Address/data bus 198 and control bus 200 are connected to the DRAMS 150 (FIG. 3).

In operation, when the most significant bits 190 of remaining instructions 1–4 are "1" in a clock cycle of the microprocessor 50, there are no memory reference instructions in the queue. The output of decoder 192 on line 196 requests an instruction fetch ahead by memory controller 118 without interference with other accesses. While the current instructions in instruction register 108 are executing, the memory controller 118 obtains the address of the next set of four instructions from program counter 130 and obtains that set of instructions. By the time the current set of instructions has completed execution, the next set of instructions is ready for loading into the instruction register.

Details of the DMA CPU 72 are provided in FIG. 5. Internal data bus 90 is connected to memory controller 118 and to DMA instruction register 210. The DMA instruction register 210 is connected to DMA program counter 212 by bus 214, to transfer size counter 216 by bus 218 and to timed transfer interval counter 220 by bus 222. The DMA instruction register 210 is also connected to DMA I/O and RAM address register 224 by line 226. The DMA I/O and RAM address register 224 is connected to the memory controller 118 by memory cycle request line 228 and bus 230. The DMA program counter 212 is connected to the internal address bus 136 by bus 232. The transfer size counter 216 is connected to a DMA instruction done decrementer 234 by lines 236 and 238. The decrementer 234 receives a control input on memory cycle acknowledge line 240. When transfer size counter 216 has completed its count, it provides a control signal to DMA program counter 212 on line 242. Timed transfer interval counter 220 is connected to decrementer 244 by lines 246 and 248. The decrementer 244 receives a control input from a microprocessor system clock on line 250.

The DMA CPU 72 controls itself and has the ability to fetch and execute instructions. It operates as a co-processor to the main CPU 70 (FIG. 2) for time specific processing.

FIG. 6 shows how the microprocessor 50 is connected to an electrically programmable read only memory (EPROM) 260 by reconfiguring the data lines 52 so that some of the data lines 52 are input lines and some of them are output lines. Data lines 52 D0–D7 provide data to and from corresponding data terminals 262 of the EPROM 260. Data lines 52 D9–D18 provide addresses to address terminals 264 of the EPROM 260. Data lines 52 D19–D31 provide inputs from the microprocessor 50 to memory and I/O decode logic 266. RAS 0/1 control line 268 provides a control signal for determining whether the memory and I/O decode logic provides a DRAM RAS output on line 270 or a column enable output for the EPROM 260 on line 272. Column address strobe terminal 60 of the microprocessor 50 provides an output enable signal on line 274 to the corresponding terminal 276 of the EPROM 260.

FIGS. 7 and 8 show the front and back of a one card data processing system 280 incorporating the microprocessor 50, MSM514258-10 type DRAMs 150 totalling 2 megabytes, a Motorola 50 MegaHertz crystal oscillator clock 282, I/O circuits 284 and a 27256 type EPROM 260. The I/O circuits 284 include a 74HC04 type high speed hex inverter circuit 286, an IDT39C828 type 10-bit inverting buffer circuit 288, an IDT39C822 type 10-bit inverting register circuit 290, and two IDT39C823 type 9-bit non-inverting register circuits 292. The card 280 is completed with a MAX12V type DC-DC converter circuit 294, 34-pin dual AMP type headers 296, a coaxial female power connector 298, and a 3-pin AMP right angle header 300. The card 280 is a low cost, imbeddable product that can be incorporated in larger systems or used as an internal development tool.

The microprocessor 50 is a very high performance (50 MHz) RISC influenced 32-bit CPU designed to work closely with dynamic RAM. Clock for clock, the microprocessor 50 approaches the theoretical performance limits possible with a single CPU configuration. Eventually, the microprocessor 50 and any other processor is limited by the bus bandwidth and the number of bus paths. The critical conduit is between the CPU and memory.

One solution to the bus bandwidth/bus path problem is to integrate a CPU directly onto the memory chips, giving every memory a direct bus to the CPU. FIG. 9 shows another microprocessor 310 that is provided integrally with 1 megabit of DRAM 311 in a single integrated circuit 312. Until the present invention, this solution has not been practical, because most high performance CPUs require from 500,000 to 1,000,000 transistors and enormous die sizes just by themselves. The microprocessor 310 is equivalent to the microprocessor 50 in FIGS. 1–8. The microprocessors 50 and 310 are the most transistor efficient high performance CPUs in existence, requiring fewer than 50,000 transistors for dual processors 70 and 72 (FIG. 2) or 314 and 316 (less memory). The very high speed of the microprocessors 50 and 310 is to a certain extent a function of the small number of active devices. In essence, the less silicon gets in the way, the faster the electrons can get where they are going.

The microprocessor 310 is therefore the only CPU suitable for integration on the memory chip die 312. Some simple modifications to the basic microprocessor 50 to take advantage of the proximity to the DRAM array 311 can also increase the microprocessor 50 clock speed by 50 percent, and probably more.

The microprocessor 310 core on board the DRAM die 312 provides most of the speed and functionality required for a large group of applications from automotive to peripheral control. However, the integrated CPU 310/DRAM 311 concept has the potential to redefine significantly the way multiprocessor solutions can solve a spectrum of very compute intensive problems. The CPU 310/DRAM 311 combination eliminates the Von Neumann bottleneck by distributing it across numerous CPU/DRAM chips 312. The microprocessor 310 is a particularly good core for multiprocessing, since it was designed with the SDI targeting array in mind, and provisions were made for efficient interprocessor communications.

Traditional multiprocessor implementations have been very expensive in addition to being unable to exploit fully the available CPU horsepower. Multiprocessor systems have typically been built up from numerous board level or box level computers. The result is usually an immense amount of hardware with corresponding wiring, power consumption and communications problems. By the time the systems are interconnected, as much as 50 percent of the bus speed has been utilized just getting through the interfaces.

In addition, multiprocessor system software has been scarce. A multiprocessor system can easily be crippled by an inadequate load-sharing algorithm in the system software, which allows one CPU to do a great deal of work and the others to be idle. Great strides have been made recently in systems software, and even UNIX V.4 may be enhanced to support multiprocessing. Several commercial products from such manufacturers as DUAL Systems and UNISOFT do a credible job on 68030 type microprocessor systems now.

The microprocessor 310 architecture eliminates most of the interface friction, since up to 64 CPU 310/RAM 311 processors should be able to intercommunicate without buffers or latches. Each chip 312 has about 40 MIPS raw speed, because placing the DRAM 311 next to the CPU 310 allows the microprocessor 310 instruction cycle to be cut in half, compared to the microprocessor 50. A 64 chip array of these chips 312 is more powerful than any other existing computer. Such an array fits on a 3×5 card, costs less than a FAX machine, and draws about the same power as a small television.

Dramatic changes in price/performance always reshape existing applications and almost always create new ones. The introduction of microprocessors in the mid 1970s created video games, personal computers, automotive computers, electronically controlled appliances, and low cost computer peripherals.

The integrated circuit 312 will find applications in all of the above areas, plus create some new ones. A common generic parallel processing algorithm handles convolution/ Fast Fourier Transform (FFT)/pattern recognition. Interesting product possibilities using the integrated circuit 312 include high speed reading machines, real-time speech recognition, spoken language translation, real-time robot vision, a product to identify people by their faces, and an automotive or aviation collision avoidance system.

A real time processor for enhancing high density television (HDTV) images, or compressing the HDTV information into a smaller bandwidth, would be very feasible. The load sharing in HDTV could be very straightforward. Splitting up the task according to color and frame would require 6, 9 or 12 processors. Practical implementation might require 4 meg RAMs integrated with the microprocessor 310.

The microprocessor 310 has the following specifications:
CONTROL LINES
  4-POWER/GROUND
  1-CLOCK
  32-DATA I/O
  4-SYSTEM CONTROL
    EXTERNAL MEMORY FETCH
    EXTERNAL MEMORY FETCH AUTOINCREMENT X
    EXTERNAL MEMORY FETCH AUTOINCREMENT Y
    EXTERNAL MEMORY WRITE
    EXTERNAL MEMORY WRITE AUTOINCREMENT X
    EXTERNAL MEMORY WRITE AUTOINCREMENT Y
    EXTERNAL PROM FETCH
    LOAD ALL X REGISTERS
    LOAD ALL Y REGISTERS
    LOAD ALL PC REGISTERS
    EXCHANGE X AND Y
    INSTRUCTION FETCH
    ADD TO PC
    ADD TO X
    WRITE MAPPING REGISTER
    READ MAPPING REGISTER
  REGISTER CONFIGURATION
  MICROPROCESSOR 310 CPU 316 CORE
  COLUMN LATCH1 (1024 BITS) 32×32 MUX
  STACK POINTER (16 BITS)
  COLUMN LATCH2 (1024 BITS) 32×MUX
  RSTACK POINTER (16 BITS)
  PROGRAM COUNTER 32 BITS
  X0 REGISTER 32 BITS (ACTIVATED ONLY FOR ON-CHIP ACCESSES)
  Y0 REGISTER 32 BITS (ACTIVATED ONLY FOR ON-CHIP ACCESSES)
  LOOP COUNTER 32 BITS
  DMA CPU 314 CORE
  DMA PROGRAM COUNTER 24 BITS
  INSTRUCTION REGISTER 32 BITS
  I/O & RAM ADDRESS REGISTER 32 BITS
  TRANSFER SIZE COUNTER 12 BITS
  INTERVAL COUNTER 12 BITS To offer memory expansion for the basic chip 312, an intelligent DRAM can be produced. This chip will be optimized for high speed operation with the integrated circuit 312 by having three on-chip address registers: Program Counter, X Register and Y register. As a result, to access the intelligent DRAM, no address is required, and a total access cycle could be as short as 10 nsec. Each expansion DRAM would maintain its own copy of the three registers and would be identified by a code specifying its memory address. Incrementing and adding to the three registers will actually take place on the memory chips. A maximum of 64 intelligent DRAM peripherals would allow a large system to be created without sacrificing speed by introducing multiplexers or buffers.

There are certain differences between the microprocessor 310 and the microprocessor 50 that arise from providing the microorocessor 310 on the same die 312 with the DRAM 311. Integrating the DRAM 311 allows architectural changes in the microprocessor 310 logic to take advantage of existing on-chip DRAM 311 circuitry. Row and column design is inherent in memory architecture. The DRAMs 311 access random bits in a memory array by first selecting a row of 1024 bits, storing them into a column latch, and then selecting one of the bits as the data to be read or written.

The time required to access the data is split between the row access and the column access. Selecting data already stored in a column latch is faster than selecting a random bit by at least a factor of six. The microprocessor 310 takes advantage of this high speed by creating a number of column latches and using them as caches and shift registers. Selecting a new row of information may be thought of as performing a 1024-bit read or write with the resulting immense bus bandwidth.

1. The microprocessor 50 treats its 32-bit instruction register 108 (see FIGS. 2 and 4) as a cache for four 8-bit instructions. Since the DRAM 311 maintains a 1024-bit latch for the column bits, the microprocessor 310 treats the column latch as a cache for 128 8-bit instructions. Therefore, the next instruction will almost always be already present in the cache. Long loops within the cache are also possible and more useful than the 4 instruction loops in the microprocessor 50.

2. The microprocessor 50 uses two 16×32-bit deep register arrays 74 and 134 (FIG. 2) for the parameter stack and the return stack. The microprocessor 310 creates two other 1024-bit column latches to provide the equivalent of two 32×32-bit arrays, which can be accessed twice as fast as a register array.

3. The microprocessor 50 has a DMA capability which can be used for I/O to a video shift register. The microprocessor 310 uses yet another 1024-bit column latch as a long video shift register to drive a CRT display directly. For color displays, three on-chip shift registers could also be used. These shift registers can transfer pixels at a maximum of 100 MHz.

4. The microprocessor 50 accesses memory via an external 32-bit bus. Most of the memory 311 for the microprocessor 310 is on the same die 312. External access to more memory is made using an 8-bit bus. The result is a smaller die, smaller package and lower power consumption than the microprocessor 50.

5. The microprocessor 50 consumes about a third of its operating power charging and discharging the I/O pins and associated capacitances. The DRAMs 150 (FIG. 8) connected to the microprocessor 50 dissipate most of their power in the I/O drivers. A microprocessor 310 system will consume about one-tenth the power of a microprocessor 50 system, since having the DRAM 311 next to the processor 310 eliminates most of the external capacitances to be charged and discharged.

6. Multiprocessing means splitting a computing task between numerous processors in order to speed up the solution. The popularity of multiprocessing is limited by the expense of current individual processors as well as the limited interprocessor communications ability. The microprocessor 310 is an excellent multiprocessor candidate, since the chip 312 is a monolithic computer complete with memory, rendering it low-cost and physically compact.

The shift registers implemented with the microprocessor 310 to perform video output can also be configured as interprocessor communication links. The INMOS transputer attempted a similar strategy, but at much lower speed and without the performance benefits inherent in the microprocessor 310 column latch architecture. Serial I/O is a prerequisite for many multiprocessor topologies because of the many neighbor processors which communicate. A cube has 6 neighbors. Each neighbor communicates using these lines:

DATA IN
CLOCK IN
READY FOR DATA
DATA OUT
DATA READY?
CLOCK OUT

A special start up sequence is used to initialize the on-chip DRAM 311 in each of the processors.

The microprocessor 310 column latch architecture allows neighbor processors to deliver information directly to internal registers or even instruction caches of other chips 312. This technique is not used with existing processors, because it only improves performance in a tightly coupled DRAM system.

7. The microprocessor 50 architecture offers two types of looping structures: LOOP-IF-DONE and MICRO-LOOP. The former takes an 8-bit to 24-bit operand to describe the entry point to the loop address. The latter performs a loop entirely within the 4 instruction queue and the loop entry point is implied as the first instruction in the queue. Loops entirely within the queue run without external instruction fetches and execute up to three times as fast as the long loop construct. The microprocessor 310 retains both constructs with a few differences. The microprocessor 310 microloop functions in the same fashion as the microprocessor 50 operation, except the queue is 1024-bits or 128 8-bit instructions long. The microprocessor 310 microloop can therefore contain jumps, branches, calls and immediate operations not possible in the 4 8-bit instruction microprocessor 50 queue.

Microloops in the microprocessor 50 can only perform simple block move and compare functions. The larger microprocessor 310 queue allows entire digital signal processing or floating point algorithms to loop at high speed in the queue.

The microprocessor 50 offers four instructions to redirect execution:

CALL
BRANCH
BRANCH-IF-ZERO
LOOP-IF-NOT-DONE

These instructions take a variable length address operand 8, 16 or 24 bits long. The microprocessor 50 next address logic treats the three operands similarly by adding or subtracting them to the current program counter. For the microprocessor 310, the 16 and 24-bit operands function in the same manner as the 16 and 24-bit operands in the microprocessor 50. The 8-bit class operands are reserved to operate entirely within the instruction queue. Next address decisions can therefore be made quickly, because only 10 bits of addresses are affected, rather than 32. There is no carry or borrow generated past the 10 bits.

8. The microprocessor 310 CPU 316 resides on an already crowded DRAM die 312. To keep chip size as small as possible, the DMA processor 72 of the microprocessor 50 has been replaced with a more traditional DMA controller 314. DMA is used with the microprocessor 310 to perform the following functions:

Video output to a CRT

Multiprocessor serial communications 8-bit parallel I/O

The DMA controller 314 can maintain both serial and parallel transfers simultaneously. The following DMA sources and destinations are supported by the microprocessor 310:

| DESCRIPTION | I/O | LINES |
| --- | --- | --- |
| 1. Video shift register | OUTPUT | 1 to 3 |
| 2. Multiprocessor serial | BOTH | 6 lines/channel |
| 3. 8-bit parallel | BOTH | 8 data, 4 control |

The three sources use separate 1024-bit buffers and separate I/O pins. Therefore, all three may be active simultaneously without interference.

The microprocessor 310 can be implemented with either a single multiprocessor serial buffer or separate receive and sending buffers for each channel, allowing simultaneous bidirectional communications with six neighbors simultaneously.

FIGS. 10 and 11 provide details of the PROM DMA used in the microprocessor 50. The microprocessor 50 executes faster than all but the fastest PROMs. PROMS are used in a microprocessor 50 system to store program segments and perhaps entire programs. The microprocessor 50 provides a feature on power-up to allow programs to be loaded from low-cost, slow speed PROMs into high speed DRAM for execution. The logic which performs this function is part of the DMA memory controller 118. The operation is similar to DMA, but not identical, since four 8-bit bytes must be assembled on the microprocessor 50 chip, then written to the DRAM 150.

The microprocessor 50 directly interfaces to DRAM 150 over a triple multiplexed data and address bus 350, which carries RAS addresses, CAS addresses and data. The EPROM 260, on the other hand, is read with non-multiplexed busses. The microprocessor 50 therefore has a special mode which unmultiplexes the data and address lines to read 8 bits of EPROM data. Four 8-bit bytes are read in this fashion. The multiplexed bus 350 is turned back on, and the data is written to the DRAM 150.

When the microprocessor 50 detects a RESET condition, the processor stops the main CPU 70 and forces a mode 0 (PROM LOAD) instruction into the DMA CPU 72 instruction register. The DMA instruction directs the memory controller to read the EPROM 260 data at 8 times the normal access time for memory. Assuming a 50 MHz microprocessor 50, this means an access time of 320 nsec. The instruction also indicates:

The selection address of the EPROM 260 to be loaded,

The number of 32-bit words to transfer,

The DRAM 150 address to transfer into.

The sequence of activities to transfer one 32-bit word from EPROM 260 to DRAM 150 are:

1. RAS goes low at 352, latching the EPROM 260 select information from the high order address bits. The EPROM 260 is selected.

2. Twelve address bits (consisting of what is normally DRAM CAS addresses plus two byte select bits are placed on the bus 350 going to the EPROM 260 address pins. These signals will remain on the lines until the data from the EPROM 260 has been read into the microprocessor 50. For the first byte, the byte select bits will be binary 00.

3. CAS goes low at 354, enabling the EPROM 260 data onto the lower 8 bits of the external address/data bus 350. NOTE: It is important to recognize that, during this part of the cycle, the lower 8 bits of the external data/address bus are functioning as inputs, but the rest of the bus is still acting as outputs.

4. The microprocessor 50 latches these eight least significant bits internally and shifts them 8 bits left to shift them to the next significant byte position.

5. Steps 2, 3 and 4 are repeated with byte address 01.

6. Steps 2, 3 and 4 are repeated with byte address 10.

7. Steps 2, 3 and 4 are repeated with byte address 11.

8. CAS goes high at 356, taking the EPROM 260 off the data bus.

9. RAS goes high at 358, indicating the end of the EPROM 260 access.

10. RAS goes low at 360, latching the DRAM select information from the high order address bits. At the same time, the RAS address bits are latched into the DRAM 155. The DRAM 150 is selected.

11. CAS goes low at 362, latching the DRAM 150 CAS addresses.

12. The microprocessor 50 places the previously latched EPROM 260 32-bit data onto the external address/data bus 350. W goes low at 364, writing the 32 bits into the DRAM 150.

13. W goes high at 366. CAS goes high at 368. The process continues with the next word.

FIG. 12 shows details of the microprocessor 50 memory controller 118. In operation, bus requests stay present until they are serviced. CPU 70 requests are prioritized at 370 in the order of: 1, Parameter Stack; 2, Return Stack; 3, Data Fetch; 4, Instruction Fetch. The resulting CPU request signal and a DMA request signal are supplied as bus requests to bus control 372, which provides a bus grant signal at 374. Internal address bus 136 and a DMA counter 376 provide inputs to a multiplexer 378. Either a row address or a column address are provided as an output to multiplexed address bus 380 as an output from the multiplexer 378. The multiplexed address bus 380 and the internal data bus 90 provide address and data inputs, respectively, to multiplexer 382. Shift register 384 supplies row address strobe (RAS) 1 and 2 control signals to multiplexer 386 and column address strobe (CAS) 1 and 2 control signals to multiplexer 388 on lines 390 and 392. The shift register 384 also supplies output enable (OE) and write (W) signals on lines 394 and 396 and a control signal on line 398 to multiplexer 382. The shift register 384 receives a RUN signal on line 400 to generate a memory cycle and supplies a MEMORY READY signal on line 402 when an access is complete.

STACK/REGISTER ARCHITECTURE

Most microprocessors use on-chip registers for temporary storage of variables. The on-chip registers access data faster than off-chip RAM. A few microprocessors use an on-chip push down stack for temporary storage.

A stack has the advantage of faster operation compared to on-chip registers by avoiding the necessity to select source and destination registers. (A math or logic operation always uses the top two stack items as source and the top of stack as destination.) The stack's disadvantage is that it makes some operations clumsy. Some compiler activities in particular require on-chip registers for efficiency.

As shown in FIG. 13, the microprocessor 50 provides both on-chip registers 134 and a stack 74 and reaps the benefits of both.

BENEFITS:

1. Stack math and logic is twice as fast as those available on an equivalent register only machine. Most programmers and optimizing compilers can take advantage of this feature.

2. Sixteen registers are available for on-chip storage of local variables which can transfer to the stack for computation. The accessing of variables is three to four times as fast as available on a strictly stack machine.

The combined stack 74/register 134 architecture has not been used previously due to inadequate understanding by computer designers of optimizing compilers and the mix of transfer versus math/logic instructions.

ADAPTIVE MEMORY CONTROLLER

A microprocessor must be designed to work with small or large memory configurations. As more memory loads are added to the data, address, and control lines, the switching speed of the signals slows down. The microprocessor 50 multiplexes the address/data bus three ways, so timing between the phases is critical. A traditional approach to the problem allocates a wide margin of time between bus phases so that systems will work with small or large numbers of memory chips connected. A speed compromise of as much as 50% is required.

As shown in FIG. 14, the microprocessor 50 uses a feedback technique to allow the processor to adjust memory bus timing to be fast with small loads and slower with large ones. The OUTPUT ENABLE (OE) line 152 from the microprocessor 50 is connected to all memories 150 on the circuit board. The loading on the output enable line 152 to the microprocessor 50 is directly related to the number of memories 150 connected. By monitoring how rapidly OE 152 goes high after a read, the microprocessor 50 is able to determine when the data hold time has been satisfied and place the next address on the bus.

The level of the OE line 152 is monitored by CMOS input buffer 410 which generates an internal READY signal on line 412 to the microprocessor's memory controller. Curves 414 and 416 of the FIG. 15 graph show the difference in rise time likely to be encountered from a lightly to heavily loaded memory system. When the OE line 152 has reached a predetermined level to generate the READY signal, driver 418 generates an OUTPUT ENABLE signal on OE line 152.

SKIP WITHIN THE INSTRUCTION CACHE

The microprocessor 50 fetches four 8-bit instructions each memory cycle and stores them in a 32-bit instruction register 108, as shown in FIG. 16. A class of "test and skip" instructions can very rapidly execute a very fast jump operation within the four instruction cache.

SKIP CONDITIONS:

Always

ACC non-zero

ACC negative

Carry flag equal logic one

Never

ACC equal zero

ACC positive

Carry flag equal logic zero

The SKIP instruction can be located in any of the four byte positions 420 in the 32-bit instruction register 108. If the test is successful, SKIP will jump over the remaining one, two, or three 8-bit instructions in the instruction register 108 and cause the next four-instruction group to be loaded into the register 108. As shown, the SKIP operation is implemented by resetting the 2-bit microinstruction counter 180 to zero on line 422 and simultaneously latching the next instruction group into the register 108. Any instructions following the SKIP in the instruction register are overwritten by the new instructions and not executed.

The advantage of SKIP is that optimizing compilers and smart programmers can often use it in place of the longer conditional JUMP instruction. SKIP also makes possible microloops which exit when the loop counts down or when the SKIP jumps to the next instruction group. The result is very fast code.

Other machines (such as the PDP-8 and Data General NOVA) provide the ability to skip a single instruction. The microprocessor 50 provides the ability to skip up to three instructions.

MICROLOOP IN THE INSTRUCTION CACHE

The microprocessor 50 provides the MICROLOOP instruction to execute repetitively from one to three instructions residing in the instruction register 108. The microloop instruction works in conjunction with the LOOP COUNTER 92 (FIG. 2) connected to the internal data bus 90. To execute a microloop, the program stores a count in LOOP COUNTER 92. MICROLOOP may be placed in the first, second, third, or last byte 420 of the instruction register 108. If placed in the first position, execution will just create a delay equal to the number stored in LOOP COUNTER 92 times the machine cycle. If placed in the second, third, or last byte 420, when the microloop instruction is executed, it will test the LOOP COUNT for zero. If zero, execution will continue with the next instruction. If not zero, the LOOP COUNTER 92 is decremented and the 2-bit microinstruction counter is cleared, causing the preceding instructions in the instruction register to be executed again.

Microloop is useful for block move and search operations. By executing a block move completely out of the instruction register 108, the speed of the move is doubled, since all memory cycles are used by the move rather than being shared with instruction fetching. Such a hardware implementation of microloops is much faster than conventional software implementation of a comparable function.

OPTIMAL CPU CLOCK SCHEME

The designer of a high speed microprocessor must produce a product which operate over wide temperature ranges, wide voltage swings, and wide variations in semiconductor processing. Temperature, voltage, and process all affect transistor propagation delays. Traditional CPU designs are done so that with the worse case of the three parameters, the circuit will function at the rated clock speed. The result are designs that must be clocked a factor of two slower than their maximum theoretical performance, so they will operate properly in worse case conditions.

The microprocessor 50 uses the technique shown in FIGS. 17–19 to generate the system clock and its required phases. Clock circuit 430 is the familiar "ring oscillator" used to test process performance. The clock is fabricated on the same silicon chip as the rest of the microprocessor 50.

The ring oscillator frequency is determined by the parameters of temperature, voltage, and process. At room temperature, the frequency will be in the neighborhood of 100 MHZ. At 70 degrees Centigrade, the speed will be 50 MHZ. The ring oscillator 430 is useful as a system clock, with its stages 431 producing phase 0-phase 3 outputs 433 shown in FIG. 19, because its performance tracks the parameters which similarly affect all other transistors on the same silicon die. By deriving system timing from the ring oscillator 430, CPU 70 will always execute at the maximum frequency possible, but never too fast. For example, if the processing of a particular die is not good resulting in slow transistors, the latches and gates on the microprocessor 50 will operate slower than normal. Since the microprocessor 50 ring oscillator clock 430 is made from the same transistors on the same die as the latches and gates, it too will operate slower (oscillating at a lower frequency), providing compensation which allows the rest of the chip's logic to operate properly.

ASYNCHRONOUS/SYNCHRONOUS CPU

Most microprocessors derive all system timing from a single clock. The disadvantage is that different parts of the system can slow all operations. The microprocessor 50 provides a dual-clock scheme as shown in FIG. 17, with the CPU 70 operating asynchronously to I/O interface 432 forming part of memory controller 118 (FIG. 2) and the I/O interface 432 operating synchronously with the external world of memory and I/O devices. The CPU 70 executes at the fastest speed possible using the adaptive ring counter clock 430. Speed may vary by a factor of four depending upon temperature, voltage, and process. The external world must be synchronized to the microprocessor 50 for operations such as video display updating and disc drive reading and writing. This synchronization is performed by the I/O interface 432, speed of which is controlled by a conventional crystal clock 434. The interface 432 processes requests for memory accesses from the microprocessor 50 and acknowledges the presence of I/O data. The microprocessor 50 fetches up to four instructions in a single memory cycle and can perform much useful work before requiring another memory access. By decoupling the variable speed of the CPU 70 from the fixed speed of the I/O interface 432, optimum performance can be achieved by each. Recoupling between the CPU 70 and the interface 432 is accomplished with handshake signals on lines 436, with data/addresses passing on bus 90, 136.

ASYNCHRONOUS/SYNCHRONOUS CPU IMBEDDED ON A DRAM CHIP

System performance is enhanced even more when the DRAM 311 and CPU 314 (FIG. 9) are located on the same die. The proximity of the transistors means that DRAM 311 and CPU 314 parameters will closely follow each other. At room temperature, not only would the CPU 314 execute at 100 MHZ, but the DRAM 311 would access fast enough to keep up. The synchronization performed by the I/O interface 432 would be for DMA and reading and writing I/O ports. In some systems (such as calculators) no I/O synchronization at all would be required, and the I/O clock would be tied to the ring counter clock.

VARIABLE WIDTH OPERANDS

Many microprocessors provide variable width operands. The microprocessor 50 handles operands of 8, 16, or 24 bits using the same op-code. FIG. 20 shows the 32-bit instruction register 108 and the 2-bit microinstruction register 180 which selects the 8-bit instruction. Two classes of microprocessor 50 instructions can be greater than 8-bits, JUMP class and IMMEDIATE. A JUMP or IMMEDIATE op-code is 8-bits, but the operand can be 8, 16, or 24 bits long. This magic is possible because operands must be right justified in the instruction register. This means that the least significant bit of the operand is always located in the least significant bit of the instruction register. The microinstruction counter 180 selects which 8-bit instruction to execute. If a JUMP or IMMEDIATE instruction is decoded, the state of the 2-bit microinstruction counter selects the required 8, 16, or 24 bit operand onto the address or data bus. The unselected 8-bit bytes are loaded with zeros by operation of decoder 440 and gates 442. The advantage of this technique is the saving of a number of op-codes required to specify the different operand sizes in other microprocessors.

TRIPLE STACK CACHE

Computer performance is directly related to the system memory bandwidth. The faster the memories, the faster the computer. Fast memories are expensive, so techniques have been developed to move a small amount of high-speed memory around to the memory addresses where it is needed. A large amount of slow memory is constantly updated by the fast memory, giving the appearance of a large fast memory array. A common implementation of the technique is known as a high-speed memory cache. The cache may be thought of as fast acting shock absorber smoothing out the bumps in memory access. When more memory is required than the shock can absorb, it bottoms out and slow speed memory is accessed. Most memory operations can be handled by the shock absorber itself.

The microprocessor 50 architecture has the ALU 80 (FIG. 2) directly coupled to the top two stack locations 76 and 78. The access time of the stack 74 therefore directly affects the execution speed of the processor. The microprocessor 50 stack architecture is particularly suitable to a triple cache technique, shown in FIG. 21 which offers the appearance of a large stack memory operating at the speed of on-chip latches 450. Latches 450 are the fastest form of memory device built on the chip, delivering data in as little as 3 nsec. However latches 450 require large numbers of transistors to construct. On-chip RAM 452 requires fewer transistors than latches, but is slower by a factor of five (15 nsec access). Off-chip RAM 150 is the slowest storage of all. The microprocessor 50 organizes the stack memory hierarchy as three interconnected stacks 450, 452 and 454. The latch stack 450 is the fastest and most frequently used. The on-chip RAM stack 452 is next. The off-chip RAM stack 454 is slowest. The stack modulation determines the effective access time of the stack. If a group of stack operations never push or pull more than four consecutive items on the stack, operations will be entirely performed in the 3 nsec latch stack. When the four latches 456 are filled, the data in the bottom of the latch stack 450 is written to the top of the on-chip RAM stack 452. When the sixteen locations 458 in the on-chip RAM stack 452 are filled, the data in the bottom of the on-chip RAM stack 452 is written to the top of the off-chip RAM stack 454. When popping data off a full stack 450, four pops will be performed before stack empty line 460 from the latch stack pointer 462 transfers data from the on-chip RAM stack 452. By waiting for the latch stack 450 to empty before performing the slower on-chip RAM access, the high effective speed of the latches 456 are made available to the processor. The same approach is employed with the on-chip RAM stack 452 and the off-chip RAM stack 454.

POLYNOMIAL GENERATION INSTRUCTION

Polynomials are useful for error correction, encryption, data compression, and fractal generation. A polynomial is generated by a sequence of shift and exclusive OR operations. Special chips are provided for this purpose in the prior art.

The microprocessor 50 is able to generate polynomials at high speed without external hardware by slightly modifying how the ALU 80 works. As shown in FIG. 22, a polynomial is generated by loading the "order" (also known as the feedback terms) into C Register 470. The value thirty one (resulting in 32 iterations) is loaded into DOWN COUNTER 472. A register 474 is loaded with zero. B register 476 is loaded with the starting polynomial value. When the POLY instruction executes, C register 470 is exclusively ORed with A register 474 if the least significant bit of B register 476 is a one. Otherwise, the contents of the A register 474 passes through the ALU 80 unaltered. The combination of A and B is then shifted right (divided by 2) with shifters 478 and 480. The operation automatically repeats the specified number of iterations, and the resulting polynomial is left in A register 474.

FAST MULTIPLY

Most microprocessors offer a 16×16 or 32×32 bit multiply instruction. Multiply when performed sequentially takes one shift/add per bit, or 32 cycles for 32 bit data. The microprocessor 50 provides a high speed multiply which allows multiplication by small numbers using only a small number of cycles. FIG. 23 shows the logic used to implement the high speed algorithm. To perform a multiply, the size of the multiplier less one is placed in the DOWN COUNTER 472. For a four bit multiplier, the number three would be stored in the DOWN COUNTER 472. Zero is loaded into the A register 474. The multiplier is written bit reversed into the B Register 476. For example, a bit reversed five (binary 0101) would be written into B as 1010. The multiplicand is written into the C register 470. Executing the FAST MULT instruction will leave the result in the A Register 474, when the count has been completed. The fast multiply instruction is important because many applications scale one number by a much smaller number. The difference in speed between multiplying a 32×32 bit and a 32×4 bit is a factor of 8. If the least significant bit of the multiplier is a "ONE", the contents of the A register 474 and the C register 470 are added. If the least significant bit of the multiplier is a "ZERO", the contents of the A register are passed through the ALU 80 unaltered. The output of the ALU 80 is shifted left by shifter 482 in each iteration. The contents of the B register 476 are shifted right by the shifter 480 in each iteration.

INSTRUCTION EXECUTION PHILOSOPHY

The microprocessor 50 uses high speed D latches in most of the speed critical areas. Slower on-chip RAM is used as secondary storage.

The microprocessor 50 philosophy of instruction execution is to create a hierarchy of speed as follows:

| Logic and D latch transfers | 1 cycle | 20 nsec |
| --- | --- | --- |
| Math | 2 cycles | 40 nsec |
| Fetch/store on-chip RAM | 2 cycles | 40 nsec |
| Fetch/store in current RAS page | 4 cycles | 80 nsec |
| Fetch/store with RAS cycle | 11 cycles | 220 nsec |

With a 50 MHZ clock, many operations can be performed in 20 nsec. and almost everything else in 40 nsec.

To maximize speed, certain techniques in processor design have been used. They include:

Eliminating arithmetic operations on addresses,

Fetching up to four instructions per memory cycle,

Pipelineless instruction decoding

Generating results before they are needed,

Use of three level stack caching.

PIPELINE PHILOSOPHY

Computer instructions are usually broken down into sequential pieces, for example: fetch, decode, register read, execute, and store. Each piece will require a single machine cycle. In most Reduced Instruction Set Computer (RISC) chips, instruction require from three to six cycles.

RISC instructions are very parallel. For example, each of 70 different instructions in the SPARC (SUN Computer's RISC chip) has five cycles. Using a technique called "pipelining", the different phases of consecutive instructions can be overlapped.

To understand pipelining, think of building five residential homes. Each home will require in sequence, a foundation, framing, plumbing and wiring, roofing, and interior finish. Assume that each activity takes one week. To build one house will take five weeks.

But what if you want to build an entire subdivision? You have only one of each work crew, but when the foundation men finish on the first house, you immediately start them on the second one, and so on. At the end of five weeks, the first home is complete, but you also have five foundations. If you have kept the framing, plumbing, roofing, and interior guys all busy, from five weeks on, a new house will be completed each week.

This is the way a RISC chip like SPARC appears to execute an instruction in a single machine cycle. In reality, a RISC chip is executing one fifth of five instructions each machine cycle. And if five instructions stay in sequence, an instruction will be completed each machine cycle.

The problems with a pipeline are keeping the pipe full with instructions. Each time an out of sequence instruction such as a BRANCH or CALL occurs, the pipe must be refilled with the next sequence. The resulting dead time to refill the pipeline can become substantial when many IF/THEN/ELSE statements or subroutines are encountered.

THE PIPELINE APPROACH

The microprocessor 50 has no pipeline as such. The approach of this microprocessor to speed is to overlap instruction fetching with execution of the previously fetched instruction(s). Beyond that, over half the instructions (the most common ones) execute entirely in a single machine cycle of 20 nsec. This is possible because:

1. Instruction decoding resolves in 2.5 nsec.

2. Incremented/decremented and some math values are calculated before they are needed, requiring only a latching signal to execute.

3. Slower memory is hidden from high speed operations by high-speed D latches which access in 4 nsec.

The disadvantage for this microprocessor is a more complex chip design process. The advantage for the chip user is faster ultimate throughput since pipeline stalls cannot exist. Pipeline synchronization with availability flag bits and other such pipeline handling is not required by this microprocessor.

For example, in some RISC machines an instruction which tests a status flag may have to wait for up to four cycles for the flag set by the previous instruction to be available to be tested. Hardware and software debugging is also somewhat easier because the user doesn't have to visualize five instructions simultaneously in the pipe.

OVERLAPPING INSTRUCTION FETCH/EXECUTE

The slowest procedure the microprocessor 50 performs is to access memory. Memory is accessed when data is read or written. Memory is also read when instructions are fetched. The microprocessor 50 is able to hide fetch of the next instruction behind the execution of the previously fetched instruction(s). The microprocessor 50 fetches instructions in 4-byte instruction groups. An instruction group may contain from one to four instructions. The amount of time required to execute the instruction group ranges from 4 cycles for simple instructions to 64 cycles for a multiply.

When a new instruction group is fetched, the microprocessor instruction decoder looks at the most significant bit of all four of the bytes. The most significant bit of an instruction determines if a memory access is required. For example, CALL, FETCH, and STORE all require a memory access to execute. If all four bytes have nonzero most significant bits, the microprocessor initiates the memory fetch of the next sequential 4-byte instruction group. When the last instruction in the group finishes executing, the next 4-byte instruction group is ready and waiting on the data bus needing only to be latched into the instruction register. If the 4-byte instruction group required four or more cycles to execute and the next sequential access was a column address strobe (CAS) cycle, the instruction fetch was completely overlapped with execution.

INTERNAL ARCHITECTURE

The microprocessor 50 architecture consists of the following:

| PARAMETER STACK | <—> ALU* <—> | Y REGISTER RETURN STACK |
|---|---|---|
| <—32 BITS—> 16 DEEP | | <—32 BITS—> 16 DEEP |
| Used for math and logic. | | Used for subroutine and interrupt return addresses as well as local variables. |
| Push down stack. Can overflow into off-chip RAM. | | Push down stack. Can overflow into off-chip RAM. Can also be accessed relative to top of stack. |
| LOOP COUNTER | | (32-bits, can decrement by 1) Used by class of test and loop instructions. |
| X REGISTER | | (32-bits, can increment or decrement by 4). Used to point to RAM locations. |
| PROGRAM COUNTER | | (32-bits, increments by 4). Points to 4-byte instruction groups in RAM. |
| INSTRUCTION REG | | (32-Bits). Holds 4-byte instruction groups while they are being decoded and executed. |

*Math and logic operations use the TOP item and NEXT to top Parameter Stack items as the operands. The result is pushed onto the Parameter Stack.

*Return addresses from subroutines are placed on the Return Stack. The Y REGISTER is used as a pointer to RAM locations. Since the Y REGISTER is the top item of the Return Stack, nesting of indices is straightforward.

MODE—A register with mode and status bits.
MODE—BITS:

Slow down memory accesses by 8 if "1". Run full speed if "0". (Provided for access to slow EPROM.)

Divide the system clock by 1023 if "1" to reduce power consumption. Run full speed if "0". (On-chip counters slow down if this bit is set.)

Enable external interrupt 1.
Enable external interrupt 2.
Enable external interrupt 3.
Enable external interrupt 4.
Enable external interrupt 5.
Enable external interrupt 6.
Enable external interrupt 7.

ON-CHIP MEMORY LOCATIONS:
  MODE-BITS
  DMA-POINTER
  DMA-COUNTER
  STACK-POINTER—Pointer into Parameter Stack.
  STACK-DEPTH—Depth of on-chip Parameter Stack
  RSTACK-POINTER—Pointer into Return Stack
  RSTACK-DEPTH—Depth of on-chip Return Stack

ADDRESSING MODE HIGH POINTS

The data bus is 32-bits wide. All memory fetches and stores are 32-bits. Memory bus addresses are 30 bits. The least significant 2 bits are used to select one-of-four bytes in some addressing modes. The Program Counter, X Register, and Y Register are implemented as D latches with their outputs going to the memory address bus and the bus incrementer/decrementer. Incrementing one of these registers can happen quickly, because the incremented value has already rippled through the inc/dec logic and need only be clocked into the latch. Branches and Calls are made to 32-bit word boundaries.

INSTRUCTION SET

32-BIT INSTRUCTION FORMAT

The thirty two bit instructions are CALL, BRANCH, BRANCH-IF-ZERO, and LOOP-IF-NOT-DONE. These instructions require the calculation of an effective address. In many computers, the effective address is calculated by adding or subtracting an operand with the current Program Counter. This math operation requires from four to seven machine cycles to perform and can definitely bog down machine execution. The microprocessor's strategy is to perform the required math operation at assembly or linking time and do a much simpler "Increment to next page" or "Decrement to previous page" operation at run time. As a result, the microprocessor branches execute in a single cycle.

24-BIT OPERAND FORM:

| Byte 1 | Byte 2 | Byte 3 | Byte 4 |
|---|---|---|---|
| WWWWWW XX | - YYYYYYYY - | YYYYYYYY - | YYYYYYYY |

With a 24-bit operand, the current page is considered to be defined by the most significant 6 bits of the Program Counter.

16-BIT OPERAND FORM:
  QQQQQQQQ-WWWWWW    XX-YYYYYYYY-YYYYYYYY

With a 16-bit operand, the current page is considered to be defined by the most significant 14 bits of the Program Counter.

8-BIT OPERAND FORM:
  QQQQQQQQ-QQQQQQQQ-WWWWWW XX-YYYYYYYY

With an 8-bit operand, the current page is considered to be defined by the most significant 22 bits of the Program Counter.

QQQQQQQQ— Any 8-bit instruction.
WWWWWW—Instruction op-code.
XX—Select how the address bits will be used:
  00—Make all high-order bits zero. (Page zero addressing)
  01—Increment the high-order bits. (Use next page)
  10—Decrement the high-order bits. (Use previous page)
  11—Leave the high-order bits unchanged. (Use current page)

YYYYYYYY—The address operand field. This field is always shifted left two bits (to generate a word rather than byte address) and loaded into the Program Counter. The microprocessor instruction decoder figures out the width of the operand field by the location of the instruction op-code in the four bytes.

The compiler or assembler will normally use the shortest operand required to reach the desired address so that the leading bytes can be used to hold other instructions. The effective address is calculated by combining:

The current Program Counter,

The 8, 16, or 24 bit address operand in the instruction, Using one of the four allowed addressing modes.

EXAMPLES OF EFFECTIVE ADDRESS CALCULATION

Example 1

| Byte 1   | Byte 2   | Byte 3   | Byte 4   |
|----------|----------|----------|----------|
| QQQQQQQQ | QQQQQQQQ | 00000011 | 10011000 |

The "QQQQQQQQs" in Byte 1 and 2 indicate space in the 4-byte memory fetch which could be hold two other instructions to be executed prior to the CALL instruction. Byte 3 indicates a CALL instruction (six zeros) in the current page (indicated by the 11 bits). Byte 4 indicates that the hexadecimal number 98 will be forced into the Program Counter bits 2 through 10. (Remember, a CALL or BRANCH always goes to a word boundary so the two least significant bits are always set to zero). The effect of this instruction would be to CALL a subroutine at WORD location HEX 98 in the current page. The most significant 22 bits of the Program Counter define the current page and will be unchanged.

Example 2

| Byte 1   | Byte 2   | Byte 3   | Byte 4   |
|----------|----------|----------|----------|
| 000001 01 | 00000001 | 00000000 | 00000000 |

If we assume that the Program Counter was HEX 0000 0156 which is binary:

00000000 00000000 00000001 01010110=OLD PROGRAM COUNTER.

Byte 1 indicates a BRANCH instruction op code (000001) and "01" indicates select the next page. Byte 2,3, and 4 are the address operand. These 24-bits will be shifted to the left two places to define a WORD address. HEX 0156 shifted left two places is HEX 0558. Since this is a 24-bit operand instruction, the most significant 6 bits of the Program Counter define the current page. These six bits will be incremented to select the next page. Executing this instruction will cause the Program Counter to be loaded with HEX 0400 0558 which is binary:

00000100 00000000 00000101 01011000=NEW PROGRAM COUNTER.

INSTRUCTIONS
CALL-LONG
   0000    OOXX-YYYYYYYY-YYYYYYYY-YYYYYYYY

Load the Program Counter with the effective WORD address specified. Push the current PC contents onto the RETURN STACK.

OTHER EFFECTS: CARRY or modes, no effect. May cause Return Stack to force an external memory cycle if on-chip Return Stack is full.

BRANCH
   0000 01XX-YYYYYYYY-YYYYYYYY-YYYYYYYY

Load the Program Counter with the effective WORD address specified.

OTHER EFFECTS: NONE
BRANCH-IF-ZERO
   0000 10XX-YYYYYYYY-YYYYYYYY-YYYYYYYY

Test the TOP value on the Parameter Stack. If the value is equal to zero, load the Program Counter with the effective WORD address specified. If the TOP value is not equal to zero, increment the Program Counter and fetch and execute the next instruction.

OTHER EFFECTS: NONE
LOOP-IF-NOT-DONE
   0000 11YY-(XXXX XXXX)-(XXXX XXXX)-(XXXX XXXX)

If the LOOP COUNTER is not zero, load the Program Counter with the effective WORD address specified. If the LOOP COUNTER is zero, decrement the LOOP COUNTER, increment the Program Counter and fetch and execute the next instruction.

OTHER EFFECTS: NONE
8-BIT INSTRUCTIONS PHILOSOPHY

Most of the work in the microprocessor 50 is done by the 8-bit instructions. Eight bit instructions are possible with the microprocessor because of the extensive use of implied stack addressing. Many 32-bit architectures use 8-bits to specify the operation to perform but use an additional 24-bits to specify two sources and a destination.

For math and logic operations, the microprocessor 50 exploits the inherent advantage of a stack by designating the source operand(s) as the top stack item and the next stack item. The math or logic operation is performed, the operands are popped from the stack, and the result is pushed back on the stack. The result is a very efficient utilization of instruction bits as well as registers. A comparable situation exists between Hewlett Packard calculators (which use a stack) and Texas Instrument calculators which don't. The identical operation on an HP will require one half to one third the keystrokes of the TI.

The availability of 8-bit instructions also allows another architectural innovation, the fetching of four instructions in a single 32-bit memory cycle. The advantages of fetching multiple instructions are:

Increased execution speed even with slow memories,

Similar performance to the Harvard (separate data and instruction busses) without the expense, Opportunities to optimize groups of instructions, The capability to perform loops within this mini-cache. The microloops inside the four instruction group are effective for searches and block moves.

SKIP INSTRUCTIONS

The microprocessor 50 fetches instructions in 32-bit chunks called 4-byte instruction groups. These four bytes may contain four 8-bit instructions or some mix of 8-bit and 16 or 24-bit instructions. SKIP instructions in the microprocessor skip any remaining instructions in a 4-byte instruction group and cause a memory fetch to get the next 4-byte instruction group. Conditional SKIPs when combined with 3-byte BRANCHES will create conditional BRANCHES. SKIPs may also be used in situations when no use can be made of the remaining bytes in a 4-instruction group. A SKIP executes in a single cycle, whereas a group of three NOPs would take three cycles.

SKIP-ALWAYS—Skip any remaining instructions in this 4-byte instruction group. Increment the most significant 30-bits of the Program Counter and proceed to fetch the next 4-byte instruction group.

SKIP-IF-ZERO—If the TOP item of the Parameter Stack is zero, skip any remaining instructions in the 4-byte instruction group. Increment the most significant 30-bits of the Program Counter and proceed to fetch the next 4-byte instruction group. If the TOP item is not zero, execute the next sequential instruction.

SKIP-IF-POSITIVE—If the TOP item of the Parameter Stack has a the most significant bit (the sign bit) equal to "0", skip any remaining instructions in the 4-byte instruction group. Increment the most significant 30-bits of the Program Counter and proceed to fetch the next 4-byte instruction group. If the TOP item is not "0", execute the next sequential instruction.

SKIP-IF-NO-CARRY—If the CARRY flag from a SHIFT or arithmetic operation is not equal to "1", skip any remaining instructions in the 4-byte instruction group. Increment the most significant 30-bits of the Program Counter and proceed to fetch the next 4-byte instruction group. If the CARRY is equal to "1", execute the next sequential instruction.

SKIP-NEVER (NOP) Execute the next sequential instruction. (Delay one machine cycle).

SKIP-IF-NOT-ZERO—If the TOP item on the Parameter Stack is not equal to "0", skip any remaining instructions in the 4-byte instruction group. Increment the most significant 30-bits of the Program Counter and proceed to fetch the next 4-byte instruction group. If the TOP item is equal "0", execute the next sequential instruction.

SKIP-IF-NEGATIVE—If the TOP item on the Parameter Stack has its most significant bit (sign bit) set to "1", skip any remaining instructions in the 4-byte instruction group. Increment the most significant 30-bits of the Program Counter and proceed to fetch the next 4-byte instruction group. If the TOP item has its most significant bit set to "0", execute the next sequential instruction.

SKIP-IF-CARRY—If the CARRY flag is set to "1" as a result of SHIFT or arithmetic operation, skip any remaining instructions in the 4-byte instruction group. Increment the most significant 30-bits of the Program Counter and proceed to fetch the next 4-byte instruction group. If the CARRY flag is "0", execute the next sequential instruction.

MICROLOOPS

Microloops are a unique feature of the microprocessor architecture which allows controlled looping within a 4-byte instruction group. A microloop instruction tests the LOOP COUNTER for "0" and may perform an additional test. If the LOOP COUNTER is not "0" and the test is met, instruction execution continues with the first instruction in the 4-byte instruction group, and the LOOP COUNTER is decremented. A microloop instruction will usually be the last byte in a 4-byte instruction group, but it can be any byte. If the LOOP COUNTER is "0" or the test is not met, instruction execution continues with the next instruction. If the microloop is the last byte in the 4-byte instruction group, the most significant 30-bits of the Program Counter are incremented and the next 4-byte instruction group is fetched from memory. On a termination of the loop on LOOP COUNTER equal to "0", the LOOP COUNTER will remain at "0". Microloops allow short iterative work such as moves and searches to be performed without slowing down to fetch instructions from memory.

Example

| Byte 1 | Byte 2 | Byte 3 | Byte 4 |
| --- | --- | --- | --- |
| FETCH-VIA-X-AUTOINCREMENT | STORE-VIA-Y-AUTOINCREMENT | ULOOP-UNTIL-DONE | QQQQQQQQ |

This example will perform a block move. To initiate the transfer, X will be loaded with the starting address of the source. Y will be loaded with the starting address of the destination. The LOOP COUNTER will be loaded with the number of 32-bit words to move. The microloop will FETCH and STORE and count down the LOOP COUNTER until it reaches zero. QQQQQQQQ indicates any instruction can follow.

MICROLOOP INSTRUCTIONS

ULOOP-UNTI L-DONE—If the LOOP COUNTER is not "0", continue execution with the first instruction in the 4-byte instruction group. Decrement the LOOP COUNTER. If the LOOP COUNTER is "0", continue execution with the next instruction.

ULOOP-IF-ZERO—If the LOOP COUNTER is not "0" and the TOP item on the Parameter Stack is "0", continue execution with the first instruction in the 4-byte instruction group. Decrement the LOOP COUNTER. If the LOOP COUNTER is "0" or the TOP item is "1", continue execution with the next instruction.

ULOOP-IF-POSITIVE—If the LOOP COUNTER is not "0" and the most significant bit (sign bit) is "0", continue execution with the first instruction in the 4-byte instruction group. Decrement the LOOP COUNTER. If the LOOP COUNTER is "0" or the TOP item is "1", continue execution with the next instruction.

ULOOP-IF-NOT-CARRY-CLEAR—If the LOOP COUNTER is not "0" and the floating point exponents found in TOP and NEXT are not aligned, continue execution with the first instruction in the 4byte instruction group. Decrement the LOOP COUNTER. If the LOOP COUNTER is "0", or the exponents are aligned, continue execution with the next instruction. This instruction is specifically designed for combination with special SHIFT instructions to align two floating point numbers.

ULOOP-NEVER—(DECREMENT-LOOP-COUNTER) Decrement the LOOP COUNTER. Continue execution with the next instruction.

ULOOP-IF-NOT-ZERO—If the LOOP COUNTER is not "0" and the TOP item of the Parameter Stack is "0", continue execution with the first instruction in the 4-byte instruction group. Decrement the LOOP COUNTER. If the LOOP COUNTER is "0" or the TOP item is "1", continue execution with the next instruction.

ULOOP-IF-NEGATIVE—If the LOOP COUNTER is not "0" and the most significant bit (sign bit) of the TOP item of the Parameter Stack is "1", continue execution with the first instruction in the 4-byte instruction group. Decrement the LOOP COUNTER. If the LOOP COUNTER is "0" or the most significant bit of the Parameter Stack is "0", continue execution with the next instruction.

ULOOP-IF-CARRY-SET—If the LOOP COUNTER is not "0" and the exponents of the floating point numbers found in TOP and NEXT are not aligned, continue execution with the first instruction in the 4-byte instruction group. Decrement the LOOP COUNTER. If the LOOP COUNTER is "0" or the exponents are aligned, continue execution with the next instruction.

RETURN FROM SUBROUTINE OR INTERRUPT

Subroutine calls and interrupt acknowledgements cause a redirection of normal program execution. In both cases, the current Program Counter is pushed onto the Return Stack, so the microprocessor can return to its place in the program after executing the subroutine or interrupt service routine.

NOTE: When a CALL to subroutine or interrupt is acknowledged the Program Counter has already been incremented and is pointing to the 4-byte instruction group following the 4-byte group currently being executed. The instruction decoding logic allows the microprocessor to perform a test and execute a return conditional on the outcome of the test in a single cycle. A RETURN pops an address from the Return Stack and stores it to the Program Counter.

RETURN INSTRUCTIONS

RETURN-ALWAYS—Pop the top item from the Return Stack and transfer it to the Program Counter.

RETURN-IF-ZERO—If the TOP item on the Parameter Stack is "0", pop the top item from the Return Stack and transfer it to the Program Counter. Otherwise execute the next instruction.

RETURN-IF-POSITIVE—If the most significant bit (sign bit) of the TOP item on the Parameter Stack is a "0", pop the top item from the Return Stack and transfer it to the Program Counter. Otherwise execute the next instruction.

RETURN-IF-CARRY-CLEAR—If the exponents of the floating point numbers found in TOP and NEXT are not aligned, pop the top item from the Return Stack and transfer it to the Program Counter. Otherwise execute the next instruction.

RETURN-NEVER—(NOP) Execute the next instruction.

RETURN-IF-NOT-ZERO—If the TOP, item on the Parameter Stack is not "0", pop the top item from the Return Stack and transfer it to the Program Counter. Otherwise execute the next instruction.

RETURN-IF-NEGATIVE—If the most significant bit (sign bit) of the TOP item on the Parameter Stack is a "1", pop the top item from the Return Stack and transfer it to the Program Counter. Otherwise execute the next instruction.

RETURN-IF-CARRY-SET—If the exponents of the floating point numbers found in TOP and NEXT are aligned, pop the top item from the Return Stack and transfer it to the Program. Counter. Otherwise execute the next instruction.

HANDLING MEMORY FROM DYNAMIC RAM

The microprocessor 50, like any RISC type architecture, is optimized to handle as many operations as possible on-chip for maximum speed. External memory operations take from 80 nsec. to 220 nsec. compared with on-chip memory speeds of from 4 nsec. to 30 nsec. There are times when external memory must be accessed.

External memory is accessed using three registers:

X-REGISTER—A 30-bit memory pointer which can be used for memory access and simultaneously incremented or decremented.

Y-REGISTER—A 30-bit memory pointer which can be used for memory access and simultaneously incremented or decremented.

PROGRAM-COUNTER—A 30-bit memory pointer normally used to point to 4-byte instruction groups. External memory may be accessed at addresses relative to the PC. The operands are sometimes called "Immediate" or "Literal" in other computers. When used as memory pointer, the PC is also incremented after each operation.

MEMORY LOAD & STORE INSTRUCTIONS

FETCH-VIA-X—Fetch the 32-bit memory content pointed to by X and push it onto the Parameter Stack. X is unchanged.

FETCH-VIA-Y—Fetch the 32-bit memory content pointed to by X and push it onto the Parameter Stack. Y is unchanged.

FETCH-VIA-X-AUTOINCREMENT—Fetch the 32-bit memory content pointed to by X and push it onto the Parameter Stack. After fetching, increment the most significant 30 bits of X to point to the next 32-bit word address.

FETCH-VIA-Y-AUTOINCREMENT—Fetch the 32-bit memory content pointed to by Y and push it onto the Parameter Stack. After fetching, increment the most significant 30 bits of Y to point to the next 32-bit word address.

FETCH-VIA-X-AUTODECREMENT—Fetch the 32-bit memory content pointed to by X and push it onto the Parameter Stack. After fetching, decrement the most significant 30 bits of X to point to the previous 32-bit word address.

FETCH-VIA-Y-AUTODECREMENT—Fetch the 32-bit memory content pointed to by Y and push it onto the Parameter Stack. After fetching, decrement the most significant 30 bits of Y to point to the previous 32-bit word address.

STORE-VIA-X—Pop the top item of the Parameter Stack and store it in the memory location pointed to by X. X is unchanged.

STORE-VIA-Y—Pop the top item of the Parameter Stack and store it in the memory location pointed to by Y. Y is unchanged.

STORE-VIA-X-AUTOINCREMENT—Pop the top item of the Parameter Stack and store it in the memory location pointed to by X. After storing, increment the most significant 30 bits of X to point to the next 32-bit word address.

STORE-VIA-Y-AUTOINCREMENT—Pop the top item of the Parameter Stack and store it in the memory location pointed to by Y. After storing, increment the most significant 30 bits of Y to point to the next 32-bit word address.

STORE-VIA-X-AUTODECREMENT—Pop the top item of the Parameter Stack and store it in the memory location pointed to by X. After storing, decrement the most significant 30 bits of X to point to the previous 32-bit word address.

STORE-VIA-Y-AUTODECREMENT—Pop the top item of the Parameter Stack and store it in the memory location pointed to by Y. After storing, decrement the most significant 30 -bits of Y to point to the previous 32-bit word address.

FETCH-VIA-PC—Fetch the 32-bit memory content pointed to by the Program Counter and push it onto the Parameter Stack. After fetching, increment the most significant 30 bits of the Program Counter to point to the next 32-bit word address.

*NOTE When this instruction executes, the PC is pointing to the memory location following the instruction. The effect is of loading a 32-bit immediate operand. This is an 8-bit instruction and therefore will be combined with other 8-bit instructions in a 4-byte instruction fetch. It is possible to have from one to four FETCH-VIA-PC instructions in a 4-byte instruction fetch.

The PC increments after each execution of

FETCH-VIA-PC, so it is possible to push four immediate operands on the stack. The four operands would be the found in the four memory locations following the instruction.

BYTE-FETCH-VIA-X - Fetch the 32-bit memory content pointed to by the most significant 30 bits of X. Using the two least significant bits of X, select one of four bytes from the 32-bit memory fetch, right justify the byte in a 32-bit field and push the selected byte preceded by leading zeros onto the Parameter Stack.

BYTE-STORE-VIA-X - Fetch the 32-bit memory content pointed to by the most significant 30 bits of X. Pop the TOP item from the Parameter Stack. Using the two least significant bits of X place the least significant byte into the 32-bit memory data and write the 32-bit entity back to the location pointed to by the most significant 30 bits of X.

OTHER EFFECTS OF MEMORY ACCESS INSTRUCTIONS:

Any FETCH instruction will push a value on the Parameter Stack 74. If the on-chip stack is full, the stack will overflow into off-chip memory stack resulting in an additional memory cycle. Any STORE instruction will pop a value from the Parameter Stack 74. If the on-chip stack is empty, a memory cycle will be generated to fetch a value from off-chip memory stack.

HANDLING ON-CHIP VARIABLES

High-level languages often allow the creation of LOCAL VARIABLES. These variables are used by a particular procedure and discarded. In cases of nested procedures, layers of these variables must be maintained. On-chip storage is up to five times faster than off-chip RAM, so a means of keeping local variables on-chip can make operations run faster. The microprocessor 50 provides the capability for both on-chip storage of local variables and nesting of multiple levels of variables through the Return Stack.

The Return Stack 134 is implemented as 16 on-chip RAM locations. The most common use for the Return Stack 134 is storage of return addresses from subroutines and interrupt calls. The microprocessor allows these 16 locations to also be used as addressable registers. The 16 locations may be read and written by two instructions which indicate a Return Stack relative address from 0–15. When high-level procedures are nested, the current procedure variables push the previous procedure variables further down the Return Stack 134. Eventually, the Return Stack will automatically overflow into off-chip RAM.

ON-CHIP VARIABLE INSTRUCTIONS

READ-LOCAL-VARIABLE XXXX—Read the XXXXth location relative to the top of the Return Stack. (XXXX is a binary number from 0000–1111). Push the item read onto the Parameter Stack.

OTHER EFFECTS: If the Parameter Stack is full, the push operation will cause a memory cycle to be generated as one item of the stack is automatically stored to external RAM. The logic which selects the location performs a modulo 16 subtraction. If four local variables have been pushed onto the Return Stack, and an instruction attempts to READ the fifth item, unknown data will be returned.

WRITE-LOCAL-VARIABLE XXXX—Pop the TOP item of the Parameter Stack and write it into the XXXXth location relative to the top of the Return Stack. (XXXX is a binary number from 0000–1111.)

OTHER EFFECTS: If the Parameter Stack is empty, the pop operation will cause a memory cycle to be generated to fetch the Parameter Stack item from external RAM. The logic which selects the location performs a modulo 16 subtraction. If four local variables have been pushed onto the Return Stack, and an instruction attempts to WRITE to the fifth item, it is possible to clobber return addresses or wreak other havoc.

REGISTER AND FLIP-FLOP TRANSFER AND PUSH INSTRUCTIONS

DROP—Pop the TOP item from the Parameter Stack and discard it.

SWAP—Exchange the data in the TOP Parameter Stack location with the data in the NEXT Parameter Stack location.

DUP—Duplicate the TOP item on the Parameter Stack and push it onto the Parameter Stack.

PUSH-LOOP-COUNTER—Push the value in LOOP COUNTER onto the Parameter Stack.

POP-RSTACK-PUSH-TO-STACK—Pop the top item from the Return Stack and push it onto the Parameter Stack.

PUSH-X-REG—Push the value in the X Register onto the Parameter Stack.

PUSH-STACK-POINTER—Push the value of the Parameter Stack pointer onto the Parameter Stack.

PUSH-RSTACK-POINTER—Push the value of the Return Stack pointer onto the Return Stack.

PUSH-MODE-BITS—Push the value of the MODE REGISTER onto the Parameter Stack.

PUSH-INPUT—Read the 10 dedicated input bits and push the value (right justified and padded with leading zeros) onto the Parameter Stack.

SET-LOOP-COUNTER—Pop the TOP value from the Parameter Stack and store it into LOOP COUNTER.

POP-STACK-PUSH-TO-RSTACK—Pop the TOP item from the Parameter Stack and push it onto the Return Stack.

SET-X-REG—Pop the TOP item from the Parameter Stack and store it into the X Register.

SET-STACK-POINTER—Pop the TOP item from the Parameter Stack and store it into the Stack Pointer.

SET-RSTACK-POINTER—Pop the TOP item from the Parameter Stack and store it into the Return Stack Pointer.

SET-MODE-BITS—Pop the TOP value from the Parameter Stack and store it into the MODE BITS.

SET-OUTPUT—Pop the TOP item from the Parameter Stack and output it to the 10 dedicated output bits.

OTHER EFFECTS: Instructions which push or pop the Parameter Stack or Return Stack may cause a memory cycle as the stacks overflow back and forth between on-chip and off-chip memory.

LOADING A SHORT LITERAL

A special case of register transfer instruction is used to push an 8-bit literal onto the Parameter Stack. This instruction requires that the 8-bits to be pushed reside in the last byte of a 4-byte instruction group. The instruction op-code loading the literal may reside in ANY of the other three bytes in the instruction group.

Example

| BYTE 1 | BYTE 2 |
|---|---|
| LOAD-SHORT-LITERAL BYTE 3 | QQQQQQQQ BYTE 4 |
| QQQQQQQQ | 00001111 |

In this example, QQQQQQQQ indicates any other 8-bit instruction. When Byte 1 is executed, binary 00001111 (HEX 0f) from Byte 4 will be pushed (right justified and padded by leading zeros) onto the Parameter Stack. Then the instructions in Byte 2 and Byte 3 will execute. The microprocessor instruction decoder knows not to execute Byte 4. It is possible to push three identical 8-bit values as follows:

| BYTE 1 | BYTE 2 |
|---|---|
| LOAD-SHORT-LITERAL BYTE 3 | LOAD-SHORT-LITERAL BYTE 4 |
| LOAD-SHORT-LITERAL SHORT-LITERAL-INSTRUCTION | 00001111 |

LOAD-SHORT-LITERAL—Push the 8-bit value found in Byte 4 of the current 4-byte instruction group onto the Parameter Stack.

LOGIC INSTRUCTIONS

Logical and math operations use the stack for the source of one or two operands and as the destination for results. The stack organization is a particularly convenient arrangement for evaluating expressions. TOP indicates the top value on the Parameter Stack 74. NEXT indicates the next to top value on the Parameter Stack 74.

AND—Pop TOP and NEXT from the Parameter Stack, perform the logical AND operation on these two operands, and push the result onto the Parameter Stack.

OR—Pop TOP and NEXT from the Parameter Stack, perform the logical OR operation on these two operands, and push the result onto the Parameter Stack.

XOR—Pop TOP and NEXT from the Parameter Stack, perform the logical exclusive OR on these two operands, and push the result onto the Parameter Stack.

BIT-CLEAR—Pop TOP and NEXT from the Parameter Stack, toggle all bits in NEXT, perform the logical AND operation on TOP, and push the result onto the Parameter Stack. (Another way of understanding this instruction is thinking of it as clearing all bits in TOP that are set in NEXT.)

MATH INSTRUCTIONS

Math instruction pop the TOP item and NEXT to top item of the Parameter Stack 74 to use as the operands. The results are pushed back on the Parameter Stack. The CARRY flag is used to latch the "33rd bit" of the ALU result.

ADD—Pop the TOP item and NEXT to top item from the Parameter Stack, add the values together and push the result back on the Parameter Stack. The CARRY flag may be changed.

ADD-WITH-CARRY—Pop the TOP item and the NEXT to top item from the Parameter Stack, add the values together. If the CARRY flag is "1" increment the result. Push the ultimate result back on the Parameter Stack. The CARRY flag may be changed.

ADD-X—Pop the TOP item from the Parameter Stack and read the third item from the top of the Parameter Stack. Add the values together and push the result back on the Parameter Stack. The CARRY flag may be changed.

SUB—Pop the TOP item and NEXT to top item from the Parameter Stack, Subtract NEXT from TOP and push the result back on the Parameter Stack. The CARRY flag may be changed.

SUB-WITH-CARRY—Pop the TOP item and NEXT to top item from the Parameter Stack. Subtract NEXT from TOP. If the CARRY flag is "1" increment the result. Push the ultimate result back on the Parameter Stack. The CARRY flag may be changed.

SUB-X-

SIGNED-MULT-STEP-

UNSIGNED-MULT-STEP-

SIGNED-FAST-MULT-

FAST-MULT-STEP-

UNSIGNED-DIV-STEP-

GENERATE-POLYNOMIAL -

ROUND-

COMPARE—Pop the TOP item and NEXT to top item from the Parameter Stack. Subtract NEXT from TOP. If the result has the most significant bit equal to "0" (the result is positive), push the result onto the Parameter Stack. If the result has the most significant bit equal to "1" (the result is negative), push the old value of TOP onto the Parameter Stack. The CARRY flag may be affected.

SHIFT/ROTATE

SHIFT-LEFT—Shift the TOP Parameter Stack item left one bit. The CARRY flag is shifted into the least significant bit of TOP.

SHIFT-RIGHT—Shift the TOP Parameter Stack item right one bit. The least significant bit of TOP is shifted into the CARRY flag. Zero is shifted into the most significant bit of TOP.

DOUBLE-SHIFT-LEFT—Treating the TOP item of the Parameter Stack as the most significant word of a 64-bit number and the NEXT stack item as the least significant word, shift the combined 64-bit entity left one bit. The CARRY flag is shifted into the least significant bit of NEXT.

DOUBLE-SHIFT-RIGHT—Treating the TOP item of the Parameter Stack as the most significant word of a 64-bit number and the NEXT stack item as the least significant word, shift the combined 64-bit entity right one bit. The least significant bit of NEXT shifted into the CARRY flag. Zero shifted into the most significant bit of TOP.

OTHER INSTRUCTIONS

FLUSH-STACK—Empty all on-chip Parameter Stack locations into off-chip RAM. (This instruction is useful for multitasking applications). This instruction accesses a counter which holds the depth of the on-chip stack and can require from none to 16 external memory cycles.

FLUSH-RSTACK—Empty all on-chip Return Stack locations into off-chip RAM. (This instruction is useful for multitasking applications). This instruction accesses a counter which holds the depth of the on-chip Return Stack and can require from none to 16 external memory cycles.

It should further be apparent to those skilled in the art that various changes in form and details of the invention as shown and described may be made. It is intended that such changes be included within the spirit and scope of the claims appended hereto.

What is claimed is:

1. A data processing system in which data transfer timing is adjusted based on the number of devices that are connected in said data processing system, said data processing system comprising:

a microprocessor including a sensing circuit and a driver circuit, said driver circuit impressing a signal upon the control line;

one or more devices external to said microprocessor;

a control line connected to said one or more devices external to said microprocessor and to said sensing circuit;

said sensing circuit being configured to monitor, during a data transfer operation, a response time required for said signal to reach a predetermined electrical level upon said control line, said response time being a function of the number of devices and their interconnections on said control line; and said microprocessor adjusting the timing of data transfer between said microprocessor and said one or more devices external to said microprocessor in accordance with said response time.

2. The data processing system of claim 1 in which the predetermined electrical level is a predetermined voltage.

3. The data processing system of claim 1 in which one or more of said devices are memory.

4. The data processing system of claim 3 wherein said memory is a dynamic random-access memory.

5. The data processing system of claim 3 in which said memory is a dynamic random-access memory.

6. The data processing system of claim 3 in which said memory is a static random-access memory.

7. The data processing system of claim 1 wherein said signal impressed upon said control line corresponds to an output enable signal.

8. In a microprocessor system, a method to provide different data transfer timing based upon the number of external devices that are connected to said microprocessor by a control line, said method comprising:

applying a signal to said control line;

sensing when said signal attains a predetermined electrical level upon said control line during a first data transfer operation involving said microprocessor; and providing an indication to said microprocessor when said signal attains said predetermined electrical level, said microprocessor determining a response time required for said signal to reach said predetermined electrical level on the basis of said indication; and adjusting timing of data transfer during a subsequent data transfer operation involving said microprocessor in accordance with said response time.

9. The method of claim 8 wherein the predetermined electrical level is a predetermined voltage.

10. The method of claim 8 wherein one or more of said devices are memory.

11. The method of claim 10 wherein said memory is a dynamic random-access memory.

12. The method of claim 8 wherein said signal applied to said control line performs an output enable function.

13. A data processing system that is configured to vary data transfer timing as a function of device loading upon a control line within said data processing system, said data processing system comprising:

a microprocessor including a sensing circuit and a driver circuit, said driver circuit impressing a signal upon said control line and said sensing circuit providing a ready signal when said signal attains a predetermined electrical level upon said control line;

one or more devices external to said microprocessor, said one or more devices exchanging data with said microprocessor in accordance with said data transfer timing;

memory controller means, disposed within said microprocessor and responsive to said ready signal, for determining a response time required for said control line to attain said predetermined electrical level and for adjusting said data transfer timing in accordance with said response time;

wherein said response time is indicative of said device loading upon said control line.

14. The data processing system of claim 13 wherein said data transfer operation is a memory read operation.

15. The data processing system of claim 13 wherein said data transfer operation is a memory write operation.

16. In a data processing system including one or more devices coupled to a system bus, a method for adjusting data transfer timing, said method comprising the steps of:

connecting a control line between said one or more devices coupled to said system bus;

measuring a load capacitance associated with said system bus, said load capacitance being related to the number of said one or more devices coupled to said system bus; and adjusting timing of data transfer operations involving said one or more devices coupled to said system bus in accordance with said load capacitance.

17. The method of claim 16 wherein said measuring step includes the steps of:

impressing a signal upon said control line;

determining a response time required for said signal to attain a predetermined electrical level upon said control line during one of said data transfer operations.

18. The method of claim 17 wherein said step of adjusting said timing includes the step of adjusting timing of a next of said data transfer operations in accordance with said response time.

19. In a data processing system including one or more devices coupled to a system bus, a timing adjustment system for adjusting data transfer timing, said timing adjustment system comprising:

a control line connected between said one or more devices coupled to said system bus;

a sensing circuit for measuring a load capacitance of said system bus, said load capacitance being related to the number of said one or more devices coupled to said system bus; and means for adjusting timing of data transfer operations involving said one or more devices coupled to said system bus in accordance with said load capacitance.

20. The data processing system of claim 19 wherein said sensing circuit is disposed to monitor a response time required for a signal impressed upon said control line to attain a predetermined electrical level during one of said data transfer operations.

21. The data processing system of claim 20 wherein said means for adjusting said timing includes means for adjusting timing of a next of said data transfer operations in accordance with said response time.

* * * * *